US008832351B2

(12) United States Patent
Tuch et al.

(10) Patent No.: US 8,832,351 B2
(45) Date of Patent: Sep. 9, 2014

(54) VIRTUALIZING PROCESSOR MEMORY PROTECTION WITH "L1 ITERATE AND L2 DROP/REPOPULATE"

(75) Inventors: Harvey Tuch, Cambridge, MA (US); Prashanth P. Bungale, Cambridge, MA (US); Scott W. Devine, Katonah, NY (US); Lawrence S. Rogel, Brookline, MA (US)

(73) Assignee: VMware, Inc., Palo Alto, CA (US)

( * ) Notice: Subject to any disclaimer, the term of this patent is extended or adjusted under 35 U.S.C. 154(b) by 362 days.

(21) Appl. No.: 12/966,766

(22) Filed: Dec. 13, 2010

(65) Prior Publication Data

US 2012/0151116 A1 Jun. 14, 2012

(51) Int. Cl.
*G06F 12/10* (2006.01)
*G06F 12/14* (2006.01)
(52) U.S. Cl.
CPC .......... *G06F 12/145* (2013.01); *G06F 12/1009* (2013.01); *G06F 2212/151* (2013.01)
USPC ................................ 711/6; 711/163; 711/208
(58) Field of Classification Search
USPC ............................................. 711/6, 163, 208
See application file for complete search history.

(56) References Cited

U.S. PATENT DOCUMENTS

2009/0300645 A1* 12/2009 Devine et al. ................. 718/107
2010/0281273 A1* 11/2010 Lee et al. ...................... 713/190
2010/0313201 A1* 12/2010 Warton et al. ..................... 718/1

OTHER PUBLICATIONS

Hwang et al., Xen on ARM: System Virtualization using Xen Hypervisor for ARM-based Secure Mobile Phones, Consumer Communications and Networking Conference, 2008. CCNC 2008. 5th IEEE, pp. 257-261.*
ARM1176JZ-S Technical Reference Manual, Nov. 27, 2009, ARM Limited, Revision r0p7.*

* cited by examiner

Primary Examiner — Jared Rutz

(57) ABSTRACT

In a computing system including a processor and virtualization software including a guest operating system (OS) that utilizes a guest domain access control register (DACR) containing domain access information and guest page tables including first level page tables (L1 page tables) and second level page tables (L2 page tables), which guest page tables contain: (a) domain identifiers used to obtain domain access information from the guest DACR and (b) access permission information, wherein the domain access information and the access permission information are combined to provide an effective guest access permission, in accordance with one embodiment, a method for providing shadow page tables and processor DACR settings that virtualize processor memory protection includes: the virtualization software providing a shadow page table wherein: (a) domain identifiers in the shadow page table are used to identify domain access information in the processor DACR that are mapped from the domain access information in the guest DACR; and (b) access permissions in the shadow page table that are mapped from the effective access permission information in the guest page tables and guest DACR; wherein a memory management unit (MMU) in the processor traverses the shadow page table, accesses the processor DACR, and combines the mapped domain access information in the processor with the mapped access permission in the shadow page table to reflect the guest intended effective access permissions while isolating the guest from the virtualization software.

22 Claims, 13 Drawing Sheets

VIRTUALIZING PROCESSOR MEMORY PROTECTION WITH "L1 ITERATE AND L2 DROP/REPOPULATE"

CROSS-REFERENCE TO RELATED APPLICATIONS

This application is related to the following applications which are owned by the assignee of this application and which are filed on the same day as this application is filed: U.S. patent application Ser. No. 12/966,782, entitled: "Virtualizing Processor Memory Protection with "L1 Iterate and L2 Swizzle" and U.S. patent application Ser. No. 12/966,805, entitled "Virtualizing Processor Memory Protection with "Domain Track".

TECHNICAL FIELD

One or more embodiments of the present invention provide methods for virtualizing memory protection, and in particular, for virtualizing memory protection in an ARM processor.

BACKGROUND

The ARM (previously, the Advanced RISC Machine, and prior to that the Acorn RISC Machine) processor architecture is a 32-bit RISC processor architecture developed by ARM Holdings PLC, Maidenhead, United Kingdom, that is widely used in a number of embedded designs. Because of their power saving features, ARM processors are used in mobile electronic devices where low power consumption is a design goal. As such, ARM processors are found in nearly all consumer electronics, from portable devices (personal digital assistants (PDAs), mobile phones, media players, handheld gaming units, and calculators) to computer peripherals (hard drives, and desktop routers).

Machine virtualization is well known in the art. As is known, a virtual machine (VM) is a software abstraction—a "virtualization"—of an actual or an abstract physical computer system. As is also well known, the VM runs as a "guest" on an underlying "host" hardware platform, and guest software, such as a guest OS and guest applications, may be loaded onto the VM for execution. Because of the ubiquitous use of the ARM processor architecture in mobile devices, efforts addressed to virtualization of mobile devices have been addressed to virtualization of the ARM processor architecture, for example, by providing a mobile virtualization platform (MVP) hypervisor.

As is well known, a memory protection mechanism for ARM processor architectures versions 4-7 entails use of: (a) memory protection attributes expressed in page table descriptors; and (b) domains. Because hardware assistance does not exist today, virtualizing a memory management unit (MMU) for use in a mobile virtualization platform (MVP) hypervisor typically entails use of shadowing techniques.

The following describes various features of the ARM processor architecture that need to addressed when virtualizing memory protection.

In particular, the ARM virtual memory system architecture ("VMSA") is present on all ARM processors with an application profile in versions 4-7 of the ARM processor architecture. While there have been changes between such versions of the ARM processor architecture in the expression of memory protection attributes (for example, by introduction of a no-execute bit and semantic changes to attribute representation), all such versions share the following features: (a) two rings; and (b) a two-level tree-structured page table. In particular, there are two rings of protection on an ARM processor where a user mode is less privileged than any privileged mode which shares the same ring. Although there exists a set of security extensions intended to enable features such as secure boot loaders, these introduce a further, more privileged ring, which is ignored herein. The current privilege level is maintained in the CPSR register on an ARM processor. In further particular, a two-level tree-structured page table enables a 32-bit virtual address space to be translated to a 32-bit physical address space (40-bit in ARM processor architecture versions 6-7) by a hardware page table walker and translation lookaside buffer (TLB). The page table entries are referred to as page table descriptors, and the first and second levels of the page table are referred to as L1 and L2, respectively, herein. As is well known, L1 descriptors may either be links to L2 page tables or superpage mappings, which L1 descriptors cover 1 MB regions of address space in both cases—such a 1 MB region is referred to as a section herein. As is also well known, L2 descriptors cover 4 KB of address space.

As is well known, prior to ARM processor architecture version 6, the ARM processor architecture used a single translation table base which was stored in a register known as the TTBR (i.e., the translation table base register). However, since ARM processor architecture version 6, the ARM processor architecture has used two TTBRs, referred to as TTBR0 and TTBR1, respectively. In accordance with this usage, address space is partitioned with a configurable pivot, i.e., all virtual addresses lower than the pivot are translated using TTBR0, and virtual addresses greater than or equal to the pivot are translated using TTBR1. In the rest of this specification, TTBR refers to: (a) TTBR for ARM processor architectures prior to version 6; and (b) TTBR0/TTBR1 for ARM processor architectures version 6 and above.

As is well known, L1 descriptors contain a 4-bit domain value. In addition, L1 and L2 descriptors contain memory type information and access permissions (i.e., memory protection information) that take into account (a) the fact that user and privileged modes may have distinct read and write permissions, and (b) a no-execute bit that applies irrespective of privilege level.

In accordance with the ARM processor architecture, domain-based protection is used in addition to access permissions configured in L1 or L2 descriptors. As is known, the ARM processor architecture uses a domain access control register (DACR) which maps each domain to the following domain access values: No Access, Manager or Client. Domain-based protection only applies when paging is enabled (i.e. only on the virtual address space) and enables fine-grain protection for each 1 MB memory region in the virtual address space. For example, a domain access value of No Access on one 1 MB memory region, a domain access value of Manager on another 1 MB memory region, and a domain access value of Client on yet another 1 MB memory region. Specifically: (a) for a domain access value of No Access, any access (data or instruction) to a 1 MB section of address space that is tagged in the page table with a domain that maps to No Access results in an abort, i.e., access permissions in a corresponding L1 or L2 descriptor are ignored and no access permissions are conveyed; (b) for a domain access value of Manager, any access to a section marked Manager also ignores access permissions present in a corresponding L1 or L2 descriptor, i.e., as long as a valid descriptor exists, read, write and execute access permissions are conveyed in both user and privileged modes; and (c) for a domain access value of Client, any access to a section marked Client respects access permissions present in a corresponding L1 or L2 descriptor.

The DACR may be used by operating systems to switch access control treatment of potentially large and non-contiguous regions of the address space. In addition, it can be used to enable a kernel to enable/disable regions quickly, to enable the kernel to access its own memory when issuing load/store-as-user instructions (for example, as done by Linux), or to implement fast address space switching optimizations on ARM processor architecture versions 4-5.

Lastly, since ARM processor architecture version 6, TLBs, and in some cases instruction caches, have been tagged with address space identifiers (ASIDs) where the 8-bit ASID is specified in a register referred to as the Context ID Register (CONTEXTIDR).

In order to virtualize the ARM processor architecture, there is a need to virtualize ARM memory protection that takes into account the above-described features of the ARM processor architecture.

SUMMARY OF THE INVENTION

One or more embodiments of the present invention are methods for providing shadow page tables that virtualize processor memory protection. In particular, and in accordance with one embodiment, in a computing system comprised of a processor and virtualization software including a guest operating system (OS) that utilizes a guest domain access control register (DACR) containing domain access information and guest page tables including first level page tables (L1 page tables) and second level page tables (L2 page tables), which guest page tables contain: (a) domain identifiers used to obtain domain access information from the guest DACR and (b) access permission information, wherein the domain access information and the access permission information are combined to provide an effective guest access permission, in accordance with one embodiment, a method for providing shadow page tables and processor DACR settings that virtualize processor memory protection comprises: the virtualization software providing a shadow page table wherein: (a) domain identifiers in the shadow page table are used to identify domain access information in the processor DACR that are mapped from the domain access information in the guest DACR; and (b) access permissions in the shadow page table that are mapped from the effective access permission information in the guest page tables and guest DACR; wherein a memory management unit (MMU) in the processor traverses the shadow page table, accesses the processor DACR, and combines the mapped domain access information in the processor with the mapped access permission in the shadow page table to reflect the guest intended effective access permissions while isolating the guest from the virtualization software.

DETAILED DESCRIPTION

Figure 1:
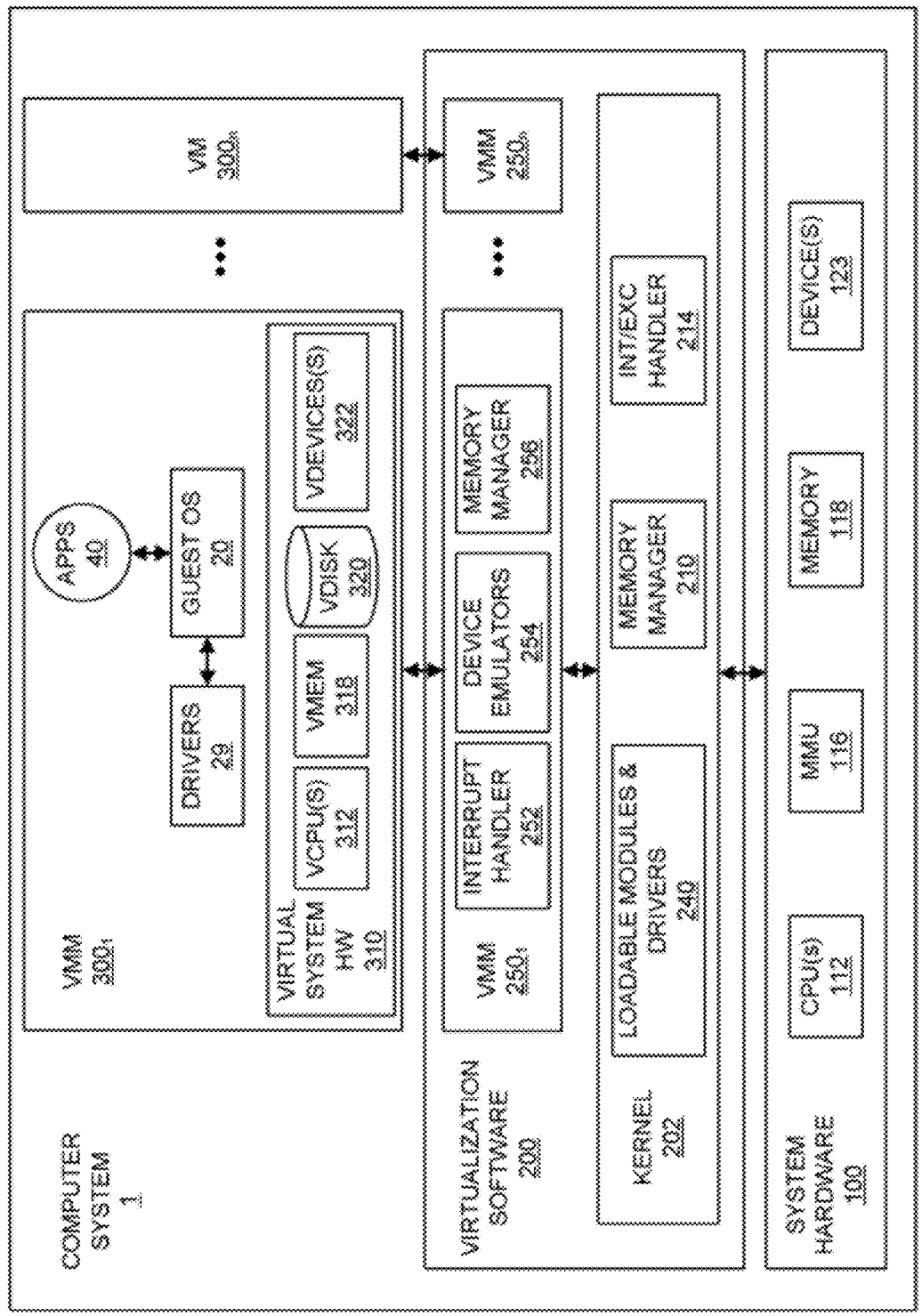
FIG. 1 shows an embodiment of a virtualized computer system on which one or more embodiments of the present invention may be utilized.

FIG. 1 shows an embodiment of a virtualized computer system on which one or more embodiments of the present invention may be utilized. In particular, FIG. 1 illustrates an embodiment of a general configuration of kernel-based, virtual computer system 1 that includes one or more virtual machines (VMs), VM 300₁-VM 300ₙ, each of which is installed as a "guest" on "host" hardware platform 100. As further shown in FIG. 1, hardware platform 100 includes ARM processor 112, memory 118, memory management unit 116, and various other conventional devices (not shown).

As further shown in FIG. 1, VM 300₁ includes virtual system hardware 310 which typically includes virtual ARM processor 312, virtual system memory 318, and various virtual devices 323. VM 300₁ also includes guest operating system 20 (guest OS 20) running on virtual system hardware 310, along with a set of drivers 29 for accessing virtual devices 323. One or more software applications 40 (apps 40) may execute in VM 300₁ on guest OS 20 and virtual system hardware 310. All of the components of VM 300₁ may be implemented in software using known techniques to emulate the corresponding components of an actual computer.

As further shown in FIG. 1, VMs 300₁-300ₙ are supported by virtualization software 200 comprising kernel 202 and a set of virtual machine monitors (VMMs), including a VMM $250_1$-VMM $250_n$. In this implementation, each VMM supports one VM. Thus, VMM $250_1$ supports VM $300_1$, and VMM $250_n$ supports VM $300_n$. As further shown in FIG. 1, VMM $250_1$ includes, among other components, device emulators 254, which may constitute virtual devices 323 accessed by VM $300_1$. VMM $250_1$ also includes memory manager 256, the general operation of which is described below. VMM $250_1$ also usually tracks, and either forwards (to some form of system software) or itself schedules and handles, all requests by VM $300_1$ for machine resources, as well as various faults and interrupts. A mechanism known in the art as an exception or interrupt handler 252 may therefore be included in VMM $250_1$. VMM $250_1$ will handle some interrupts and exceptions completely on its own. For other interrupts/exceptions, it may be either necessary or at least more efficient for VMM $250_1$ to call kernel 202 to have kernel 202 handle the interrupts/exceptions itself. VMM $250_1$ may forward still other interrupts to VM $300_1$.

Kernel 202 handles the various VMM/VMs and includes interrupt/exception handler 214 that is able to intercept and handle interrupts and exceptions for all devices on the machine. Kernel 202 also includes memory manager 210 that manages all machine memory. When kernel 202 is loaded, information about the maximum amount of memory available on the machine is available to kernel 202; part of machine memory 118 is used for kernel 202 itself, some is used to store code, data, stacks and so forth, and some is used for guest memory of virtual machines. In addition, memory manager 210 may include algorithms for dynamically allocating memory among the different VMs.

In some embodiments, kernel 202 is responsible for providing access to all devices on the physical machine, and kernel 202 will typically load conventional drivers as needed to control access to devices. Accordingly, FIG. 1 shows loadable modules and drivers 240 containing loadable kernel modules and drivers. Kernel 202 may interface with the loadable modules and drivers using an API or similar interface.

When memory addresses are generated in VM $300_1$ of FIG. 1, either by apps 40 or the system software of VM $300_k$, guest OS 20 and memory manager 256 are involved in the process of mapping the addresses to corresponding addresses in physical memory 118.

Most modern computers implement a "virtual memory" mechanism which allows user-level software to specify memory locations using a set of virtual addresses. These virtual addresses are then translated, or mapped, into a different set of physical addresses that are actually applied to physical memory to access the desired memory locations. The range of possible virtual addresses that may be used by user-level software constitutes a virtual address space, while the range of possible physical addresses that may be specified constitute a physical address space. The virtual address space is typically divided into a number of virtual memory pages, each having a different virtual page number, while the physical address space is typically divided into a number of physical memory pages, each having a different physical page number. A memory "page" in either the virtual address space or the physical address space typically comprises a particular number of memory locations, such as either a four kilobyte (KB) memory page or a one megabyte (MB) memory page.

Figure 2:
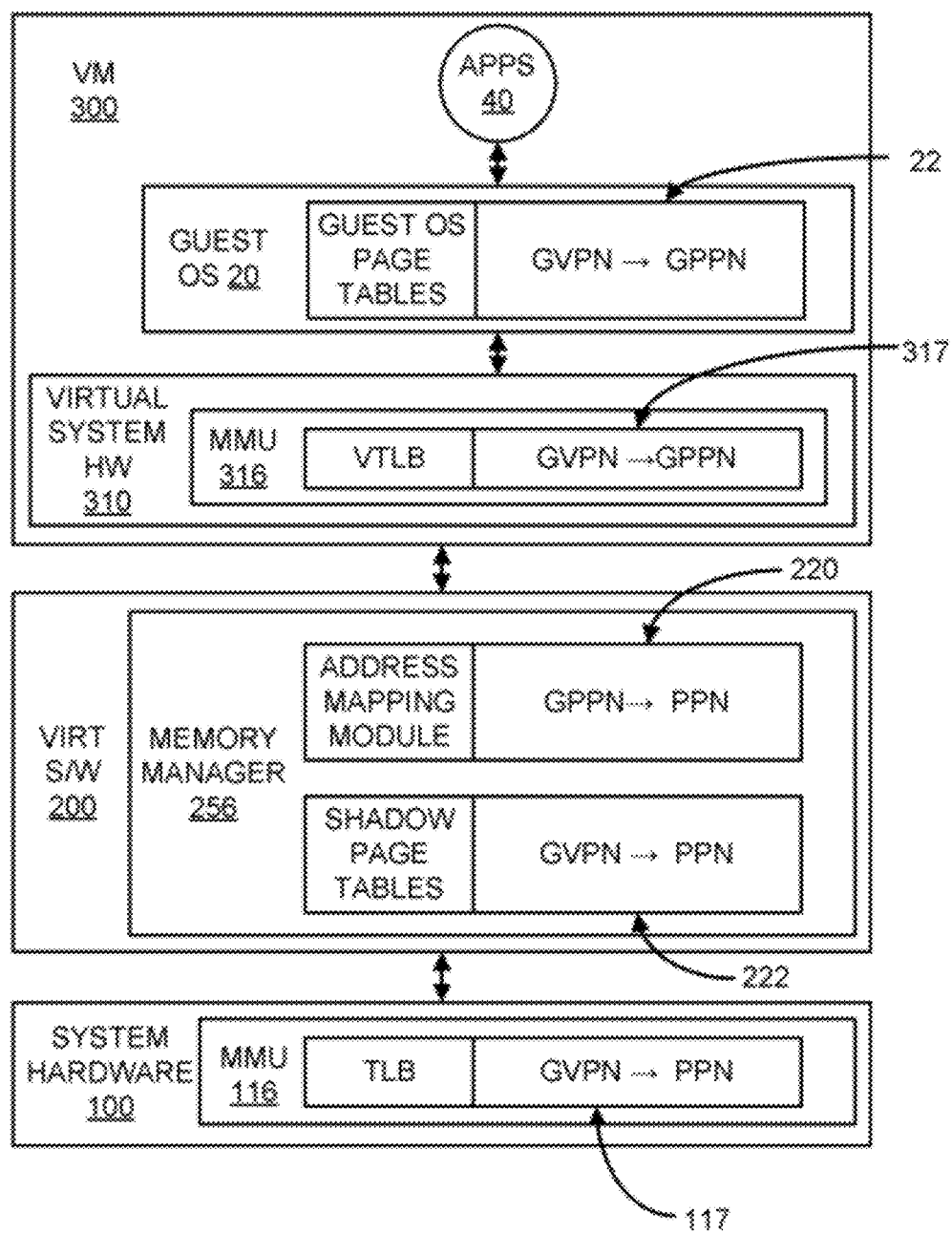
FIG. 2 illustrates an address mapping process, and some of the functional units that are involved in this process for the virtualized computer system shown in FIG. 1.

FIG. 2 illustrates an address mapping process, and some of the functional units that are involved in this process. FIG. 2 shows system hardware 100 which includes a memory management unit 116 (MMU 116), which MMU 116 further includes a translation lookaside buffer 117 (TLB 117).

Virtualization software 200 executes on system hardware 100. Virtualization software 200 includes memory manager 256, which further includes address mapping module 220 and a set of shadow page tables 222.

Virtualization software 200 supports VM $300_1$. VM $300_1$ includes virtual system hardware 310 which further includes MMU 316, which MMU 316 may further includes virtual TLB 317 (VTLB 317), although MMU 316 may also be implemented without a virtual TLB. VM $300_1$ also includes guest OS 20 and a set of one or more applications, app 40. Guest OS 20 includes guest OS page tables 22.

In operation, guest OS 20 generates guest OS page tables 22 that map guest software virtual address space to what guest OS 20 perceives to be physical address space. In other words, guest OS 20 maps GVPNs (guest virtual page numbers) to GPPNs (guest physical page numbers). Suppose, for example, that app 40 attempts to access a memory location having a first GVPN, and that guest OS 20 has specified in guest OS page tables 22 that the first GVPN is backed by what it believes to be a physical memory page having a first GPPN.

Address mapping module 220 in memory manager 256 keeps track of mappings between the GPPNs of guest OS 20 and "real" physical memory pages of physical memory within system hardware 100. Thus, address mapping module 220 maps GPPNs from guest OS 20 to corresponding PPNs in the physical memory. Continuing the above example, address mapping module 220 translates the first GPPN into a corresponding PPN, for example, a seventh PPN.

Memory manager 256 creates shadow page tables 222 that are used by hardware MMU 116. Shadow page tables 222 include a number of shadow descriptors that generally correspond to descriptors in guest OS page tables 22, but the shadow descriptors map guest software virtual addresses to corresponding physical addresses in the actual physical memory, instead of to the physical addresses specified by guest OS 20. In other words, while guest OS page tables 22 provide mappings from GVPNs to GPPNs, the shadow descriptors in shadow page tables 222 provide mappings from GVPNs to corresponding PPNs. Thus, continuing the above example, corresponding to the mapping from the first GVPN to the first GPPN, shadow page tables 222 contain a shadow descriptor that maps the first GVPN to the seventh PPN. Thus, when guest app 40 attempts to access a memory location having the first GVPN, MMU 116 loads the mapping from the first GVPN to the seventh PPN in shadow page tables 222 into physical TLB 117, if the mapping is not already there. This mapping from TLB 117 is then used to access the corresponding memory location in the physical memory page having the seventh PPN.

For purposes of this specification, certain address mapping phrases are defined as follows: address mappings or translations from guest virtual addresses to guest physical addresses (e.g. mappings from GVPNs to GPPNs) are defined as "guest address mappings" or just "guest mappings," address mappings or translations from guest physical addresses to actual physical addresses (e.g. mappings from GPPNs to PPNs) are defined as "virtualization address mappings" or just "virtualization mappings," and address mappings or translations from guest virtual addresses to actual physical addresses (e.g. from GVPNs to PPNs) are defined as "shadow address mappings" or just "shadow mappings."

As is known, CPU hardware performs page table walks on shadow page tables that virtualization software maintains. The following describes how the virtualization software maintains shadow page tables coherent with guest page tables. Shadow page tables are initially empty (except for entries for the virtualization software, which introduces the need for handling guest memory accesses on virtualization software-conflicting address spaces). As the guest operating system tries to access the guest page table, page faults are generated which are handled by the virtualization software. The virtualization software takes the following actions in response to the page faults:

1. the virtualization software walks the guest page table and determines that the page fault is valid and should be passed on to the guest (this page fault is referred to as a "true" page fault).

2. the virtualization software walks the guest page table and determines that the memory access being attempted by the guest operating system is valid as per the guest page table descriptor contents (this page fault is referred to as a "hidden" page fault). The hidden page fault could occur because of the following reasons:

a. the shadow table does not yet have a valid entry. In this case, the hardware accessible shadow page table is synchronized with the guest page table descriptor. Synchronization is performed by mapping the virtual page given by the guest operating system to the machine-page-equivalent of the guest physical page the virtual page was supposed to map to by combining the GVPN→GPPN mapping from the guest page table, with the virtualization software provided mapping of GPPN→PPN. During this process, if a PPN has not yet been allocated for the given GPPN, the virtualization software newly allocates one, and updates its mapping data structures.

b. the guest data access conflicts with the virtualization software, in which case a guest load/store instruction is emulated.

c. the data access is in a code-backed region, i.e., a region of address where accesses are transferred to specific code by invoking appropriate virtualization software callbacks.

Virtualizing ARM Memory Protection

The description above in conjunction with FIGS. 1 and 2 illustrates how guest page tables are mapped to shadow page tables. The following describes embodiments of the present invention which embody methods for mapping guest page table memory protection mechanisms onto memory protection mechanisms maintained by shadow page tables and the virtualization software. While not being restricted to use in any particular processor architecture, one or more embodiments of the present invention may be used with advantage in ARM processor architectures.

In accordance with one or more embodiments of the present invention that virtualize ARM memory protection, the virtualization software executes in Privileged mode and the guest, no matter what its virtual processor status register CPSR indicates, always executes in machine User mode to protect the virtualization software from untrusted guest privileged code and to avoid introducing virtualization holes that would otherwise exist—virtualization holes would exist if the guest could observe differences between its native and virtualized environments. Stolen guest memory is guest memory that is downgraded in terms of access permissions to facilitate intervention by the virtualization software—for example, and without limitation, code-backed memory regions or pages shared between virtual machines subject to Copy-On-Write. In addition, and in accordance with one or more embodiments of the present invention that virtualize ARM memory protection: (a) the guest cannot configure Manager access to any domain in the machine domain access control register (DACR) (since the guest could use such access to override any access permission downgrading for sections tagged with the corresponding domain, thereby potentially compromising virtualization software data stored in stolen pages or breaking the ability of the virtualization software to intercept reads/writes to code-backed memory); and (b) the virtualization software domain must be protected.

In accordance with one or more embodiments of the present invention, a set of pairs of shadow page tables is maintained in a shadow page table pool. In accordance with one or more such embodiments, each pair in the shadow page table pool is tagged with a guest ASID (address space identifier) and consists of two shadow page tables: (a) one shadow page table is used when the guest is executing in guest privileged modes; and (b) the other shadow page table is used when the guest is executing in guest user modes (or when emulating a guest load/store-as-user instruction (referred to as an LDRT/STRT)). In other words, and in accordance with one or more such embodiments, usage is switched between the shadow page tables upon switching privilege modes as indicated by the guest's virtual CPSR. As one of ordinary skill in the art would readily appreciate, user-to-privileged mode switches are detected automatically because they trap into the virtualization software, however, privileged-to-user mode switches have to be modified either statically (for example, using para-virtualization by making source-level changes to the guest to make it more suitable to be run in such a virtualized environment) or dynamically (for example, using dynamic binary translation) to introduce a trap into the virtualization software so that the virtualization software can intervene and perform the shadow page table switch. Any one of a number of methods that are known to those of ordinary skill in the art may be used routinely and without undue experimentation to detect privileged-to-user mode switches. In addition, and in accordance with one or more such embodiments, usage is switched between shadow page tables when emulating LDRT/STRT instructions (i.e., Load "As User" and Store "As User" instructions, also known as Unprivileged Load and Unprivileged Store instructions—these instructions are used by privileged mode code to perform a load or store pretending just for that instruction that execution was in user/unprivileged mode; such instructions pose a problem if executed in machine user mode as they are defined to have undefined/unpredictable semantics when executed in user mode). To do this (i.e., a switch to and from the shadow user page tables across such instructions), the guest is modified (for example, by para-virtualization) using any one of a number of methods that are known to those of ordinary skill in the art routinely and without undue experimentation to trap such instructions into the virtualization software. In accordance with one or more such embodiments, switching between shadow page tables may be accomplished by changing the address of the page table base register (TTBR).

The page tables described herein comprise first level page tables (referred to herein as L1 page tables) and second level page tables (referred to herein as L2 page tables).

Figure 3:
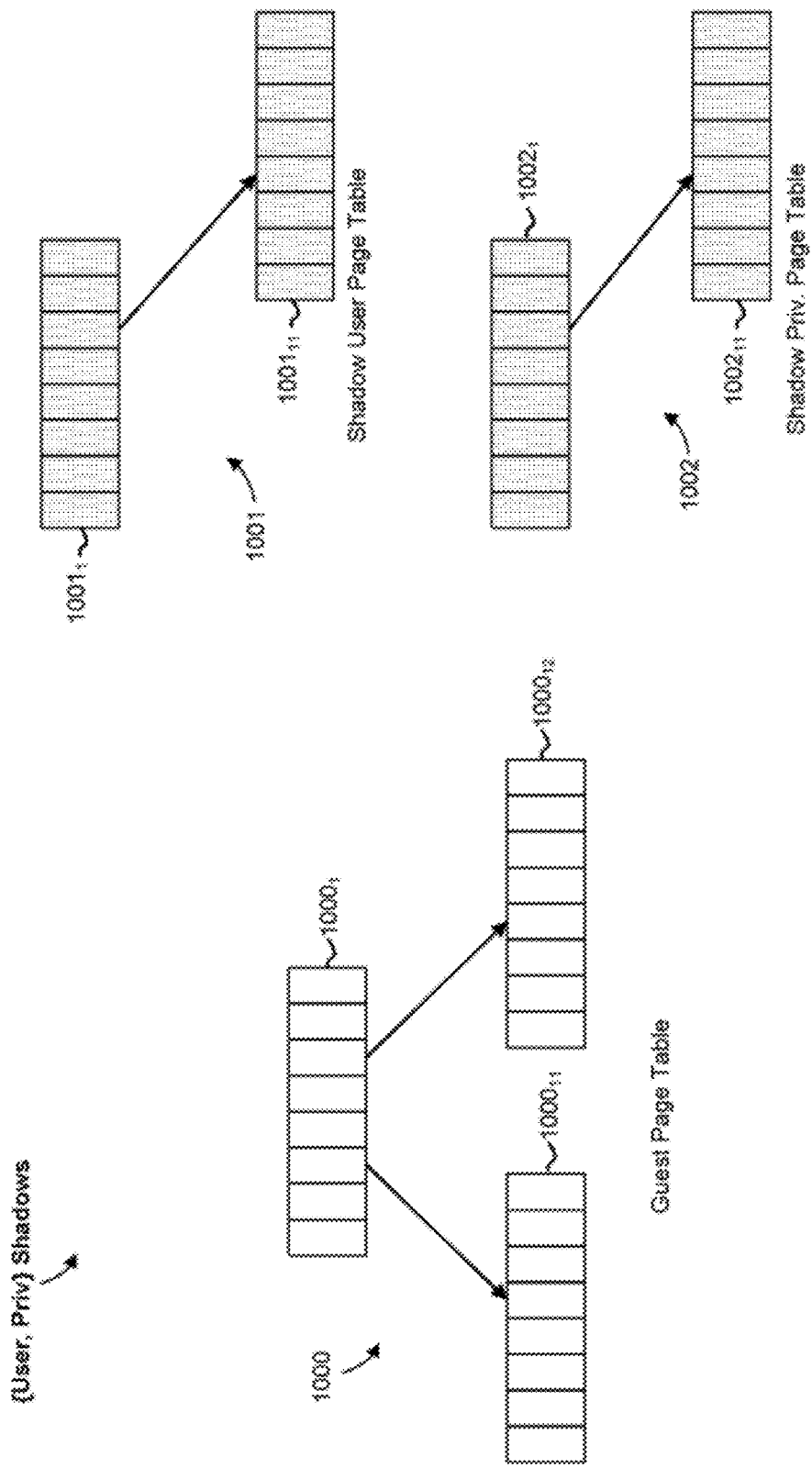
FIG. 3 shows in diagrammatic form how a guest page table is represented by a shadow user page table and a shadow privileged page table in accordance with one or more embodiments of the present invention.

FIG. 3 shows, in diagrammatic form, how guest page table 1000 (comprised of L1 page tables such as L1 page table 1000$_1$ that contains L1 descriptors that point to L2 page tables such as L2 page tables 1000$_{11}$ and 1000$_{12}$) is represented by shadow user page table 1001 (comprised of shadow user L1 page tables such as shadow user L1 page table 1001$_1$ that contains L1 descriptors that point to L2 page tables such as L2 page table 1001$_{11}$) and shadow privileged page table 1002 (comprised of shadow privileged L1 page tables such as shadow privileged L1 page table 1002$_1$ that contains L1 descriptors that point to L2 page tables such as L2 page table 1002$_{11}$).

In accordance with one or more such embodiments, a shadow page table pool is populated (as described in more detail below) with shadow page tables that are tagged with a unique machine ASID. Whenever the guest switches ASID, the shadow page table pool is searched for a matching entry. If none is found, an older entry is evicted, where the older entry is selected in accordance with an eviction policy such as, for example and without limitation, an LRU (Least Recently Used) policy in accordance with any one of a number of methods that are well known to those of ordinary skill in the art. Any guest user-privileged mode switch or CONTEXTIDR (specifies ASID) update causes a shadow page table switch. If each shadow page table in the pool has a unique machine ASID (for example, in accordance with one or more embodiments there are less than $2^7$ pairs in the shadow page table pool), any shadow page table switch incurs no TLB flush penalty since no ASID is recycled. In accordance with one or more such embodiments, the machine TTBR is switched to point to its respective shadow table on an ASID update, in addition to the machine CONTEXTIDR. In sum, when the guest operating system switches ASID, a check is made to determine whether a shadow page table has been allocated for the new ASID. If it has been allocated, the machine TTBR is updated to point to it, otherwise a new shadow page table pair is allocated and associated with the guest ASID. In the latter case, an existing shadow page table pair may be invalidated to allow for the shadow page table pair allocation.

In accordance with one or more embodiments of the present invention, shadow (User/Priv) page table pairs are maintained. Further, in accordance with one or more such embodiments, entries are lazily "faulted in" through page faults, where the guest page table is walked, and the shadow page table descriptor is assembled with: (a) the walk information; (b) the relevant mapping of GPPN→PPN; and (c) the current privilege level. Still further, in accordance with one or more such embodiments, the shadow page table is invalidated in response to any full guest TLB invalidation or a TLB invalidation by ASID match, and individual entries are invalidated in response to any guest individual TLB entry invalidation. This method relies on the guest operating system issuing TLB invalidations in response to page table updates prior to accessing the affected memory, an action required by the ARM processor in order for the update to be observable. TLB invalidations are trapped and emulated in accordance with any one of a number of methods that are well known to those of ordinary skill in the art. All ARM processor architectures, versions 4-7 can be supported with this method.

Shadow L2 page tables can be shared between shadow L1 descriptors when backing the same guest [super-]section mapping. This provides space advantages and performance improvement, since section mappings are typically used by the guest kernel and a subset will be frequently used across guest address spaces.

Page table descriptors specify both user and privileged mode permissions. Thus, there are six (6) distinct guest access permissions (guest APs) that may be encoded in an L1 or L2 descriptor, namely, {PNA-UNA, PRW-UNA, PRW-URO, PRW-URW, PRO-UNA, PRO-URO}, and in accordance with one or more embodiments of the present invention, the six (6) possible distinct guest access permissions that may be encoded in a descriptor are mapped to three (3) shadow access permission equivalence classes, namely {{PNA-UNA, PRW-UNA, PRO-UNA}, {PRW-URO, PRO-URO}, {PRW-URW}}. The abbreviations expand as follows: UNA (user no access), URO (user read-only), URW (user read-write), PNA (privileged no access), PRO (privileged read-only), and PRW (privileged read-write). In accordance with one or more embodiments of the present invention, since the guest executes in User mode, PNA-UNA, PRW-UNA and PRO-UNA used in the shadow page table descriptors are indistinguishable to the guest; as are PRW-URO and PRO-URO. Thus, in accordance with one or more embodiments of the present invention, guest access permissions are mapped as follows (note that the privileged access permissions for mappings in the shadow page tables do not matter from the guest's point of view, so they are marked P** in Table 1):

TABLE 1

Guest-Shadow Access Permission (AP) mapping

| Guest AP | Shadow Privileged page table AP | Shadow User page table AP |
|---|---|---|
| PNA-UNA | P**-UNA | P**-UNA |
| PRW-UNA | P**-URW | P**-UNA |
| PRW-URO | P**-URW | P**-URO |
| PRW-URW | P**-URW | P**-URW |
| PRO-UNA | P**-URO | P**-UNA |
| PRO-URO | P**-URO | P**-URO |

In accordance with one or more such embodiments, the no-execution (XN) bit is passed through from a guest L1 or L2 descriptor to a shadow L1 or L2 descriptor without change, subject to the domain mapping scheme (for example, Manager access overrides the XN bit).

When filling a shadow page table (for example, on a hidden page fault), in accordance with one or more embodiments of the present invention, and in addition to the conversion specified in Table 1 based on the guest L1 or L2 descriptor's access permissions and CPSR (i.e., indicating privileged or user mode), access permissions may be further downgraded by changing the mapping function that maps effective guest access permissions to shadow permissions) for the purpose of stealing and facilitating code-backed regions in the guest's physical memory address space. Since the stealing and region size granularity in the virtualization software is 4 KB, only small (4 KB) page table descriptors are used in the shadow page tables. There are other reasons for having a shadow page granularity narrower than the guest's. One reason is that this avoids depending on the state of host fragmentation when acquiring PPNs to back guest memory and can allow for demand loading at this granularity or swap/compress. Further, in accordance with one or more such embodiments, guest L1 and L2 superpages are backed with multiple 4 KB mappings in shadow L2 page tables. This means that the shadow fill granularity is still 4 KB even when the guest mapping granularity is many multiples of 4 KB. As one of ordinary skill in the art can readily appreciate, the above is merely one method that may be used to implement shadowing, and that further embodiments of the invention exist where other methods are used.

Figure 4:
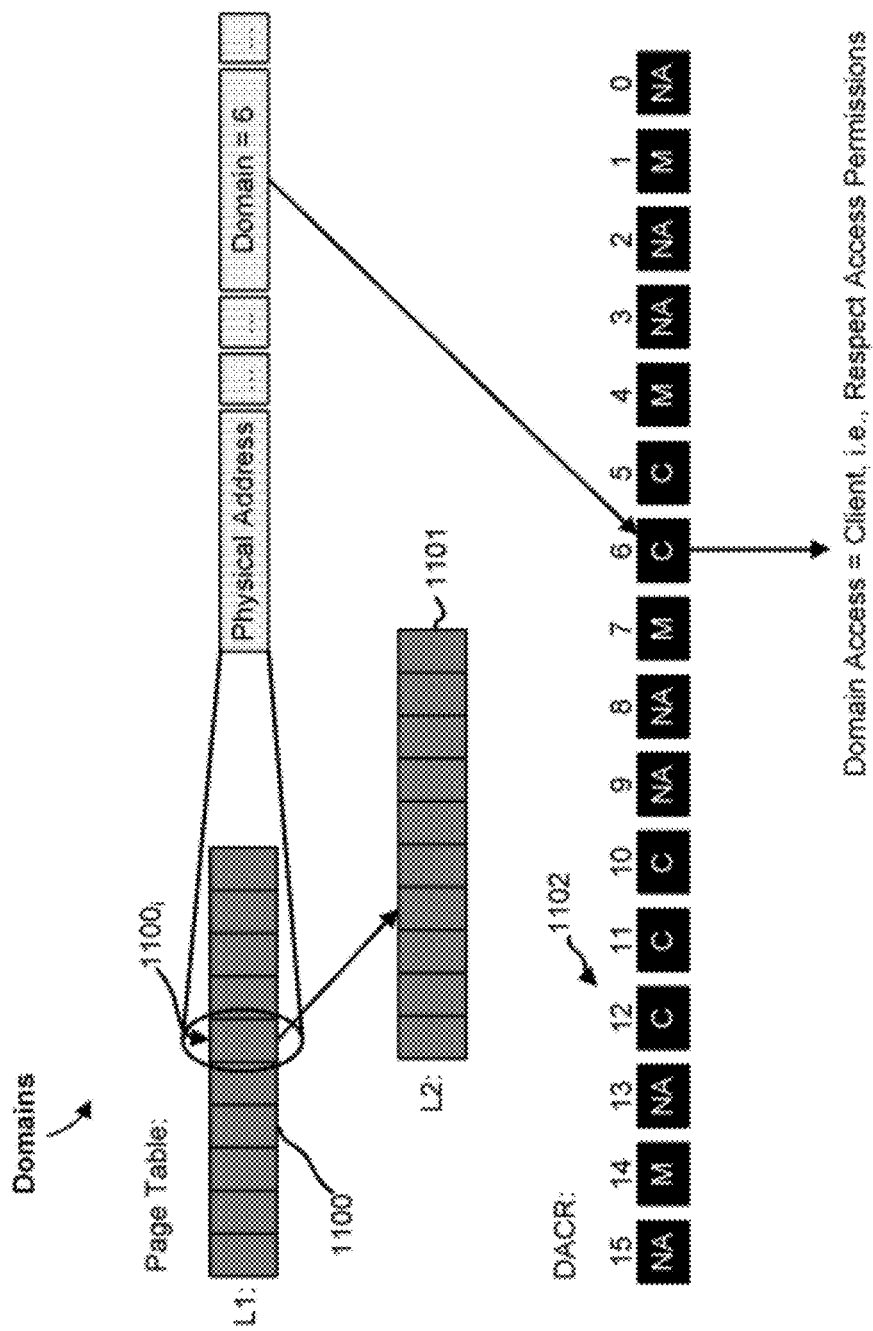
FIG. 4 illustrates how domain access values are obtained using an L1 descriptor and a Domain Access Control Register (DACR) in an ARM processor.

FIG. 4 illustrates how domain access information is obtained using an L1 descriptor and a Domain Access Control Register (DACR) in an ARM processor. As is known, in an ARM processor, an L1 descriptor contains a domain identifier field, where a domain identifier ranges from 0 thru 15. The domain identifier identifies the domain to which the 1 MB section of address space mapped by the L1 descriptor belongs. Further, the Domain Access Control Register (DACR) maps each domain identifier to a domain access value where the possible domain access values are: (a) No Access (NA)—meaning ignore the AP bits where AP bits are bits in an L1 or L2 descriptor that are used to encode access permission—(as a result, any access results in an abort); (b)

Manager (M)-meaning ignore the AP bits (as a result, any access is allowed); and (c) Client (C)-meaning respect the AP bits. FIG. 4 shows L1 page table 1100 where descriptor L1 descriptor 1100, includes: (a) the physical address of L2 page table 1101; and (b) domain identifier=6. As further shown in FIG. 4, DACR 1102 contains domain access values for the ARM domains. As further shown in FIG. 4, the domain identifier in the L1 descriptor is used to obtain the domain access value stored for domain 6 in the DACR, which domain access value=C (meaning Client, i.e., respect Access Permissions).

Figure 5:
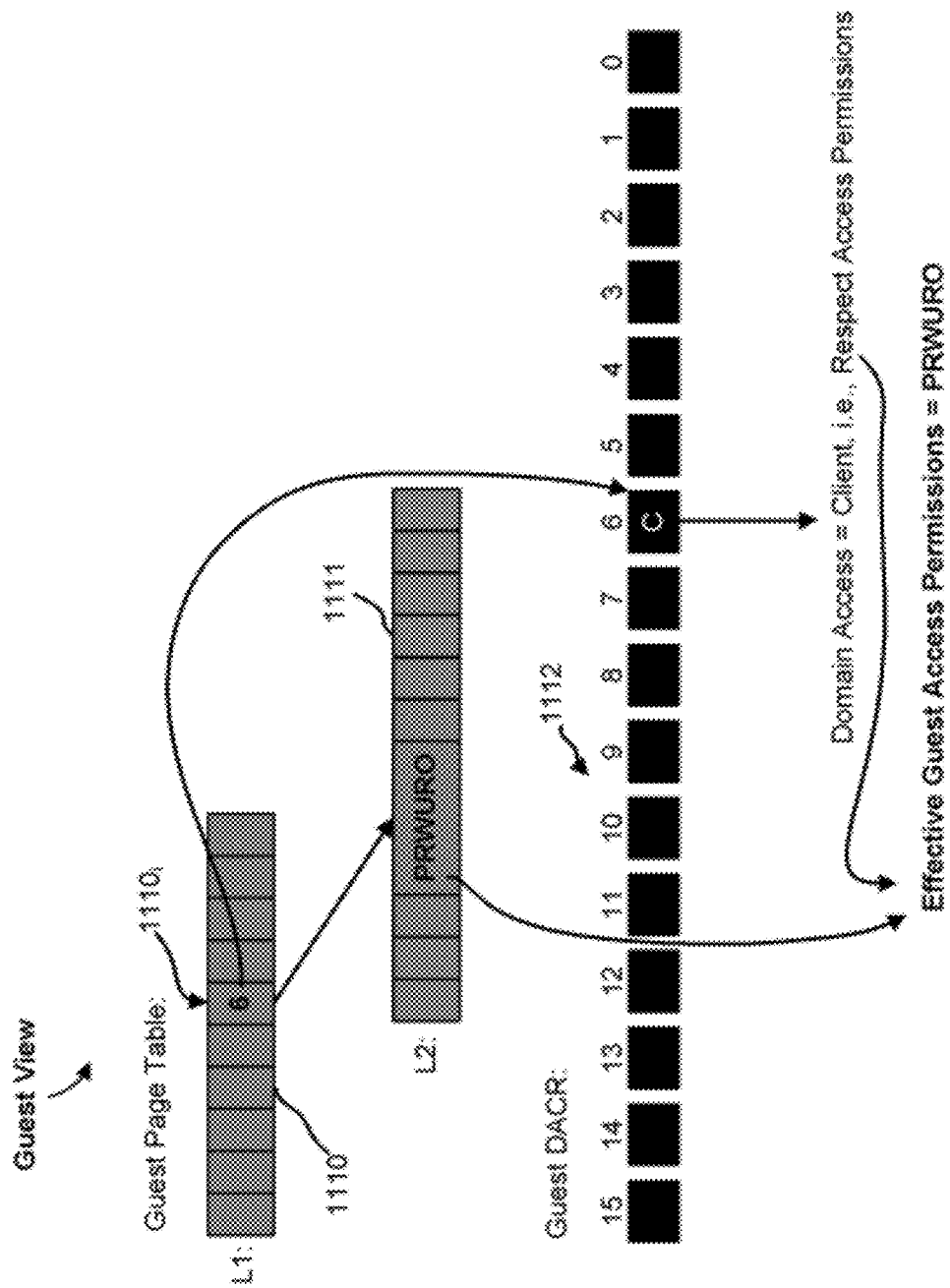
FIG. 5 illustrates how a guest access permission and a guest domain value are used to provide an "effective" guest access permission.

FIG. 5 illustrates how a guest access permission and a guest domain access value are used to provide an "effective" guest access permission. Note that virtualization of ARM memory protection in accordance with one or more embodiments of the present invention, virtualizes effective guest access permissions in a manner that is described below. As shown in FIG. 5, L1 descriptor 1110, of L1 page table 1110: (a) points to L2 page table 1111; and (b) has a domain identifier=6. As further shown in FIG. 5, L2 descriptor 1111 of L2 page table 1111 contains an access permission value equal to PRW-URO (i.e., AP=PRW-URO). As further shown in FIG. 5, guest DACR 1112 contains domain access values for the ARM domains. As further shown in FIG. 5, the domain identifier is used to obtain the domain access value stored for domain 6, which is domain access value=C (meaning Client, i.e., respect Access Permissions). Thus, for the example shown in FIG. 5, combining the domain access value and the AP results in an "effective" guest access permission=PRW-URO.

In light of the above, in accordance with one or more embodiments of the present invention, the following three (3) pieces of information are combined to provide "effective" Access Permissions: (a) domain identifier specified in the L1 descriptor; (b) the DACR mapping from domain identifier to domain access value; and (c) Access Permissions specified in the L1 or L2 descriptor.

In principle, there are three (3) possible guest domain access values, namely, No Access, Client and Manager. In accordance with one or more embodiments of the present invention, to disallow guest Manager access to any domain (at least to any stolen guest memory), the domain identifier in the L1 shadow descriptor can only point to a domain access value in the machine DACR (for example, the ARM processor DACR) that has one of two (2) values: (a) No Access; or (b) Client access—as used herein, the term machine DACR also refers to the processor DACR. As a result, in accordance with one or more embodiments of the present invention, the L1 descriptor is accessed to find the domain identifier, and the machine DACR domain access value for that domain is mapped/configured as follows: (a) if the "effective" guest domain access value is No Access it is mapped to No Access; and (b) if the "effective" guest domain access value is Client or Manager, it is mapped/configured to Client access. In accordance with one or more such embodiments, one or more domains are reserved for use by the virtualization software (i.e., the machine DACR has one or more domains reserved for the virtualization software), leaving available 15 (or less) of the 16 domains for mapping guest domains. The following assumes that the virtualization software and guest share an address space but do not share any sections within the address space. If it is necessary to share a section, for example, for the exception vector table page, additional handling may be carried out using any one of a number of methods that are well known to those of ordinary skill in the art routinely and without undue experimentation. For example, special case handling can be introduced on the shadow page fault, L1/L2 page table invalidation and guest DACR update paths to ensure that descriptors mapping the virtualization software are correctly maintained in an L2 page table covering an overlapping section and that a valid shadow L1 descriptor points to a shadow L2 page table at all times.

Figure 6:
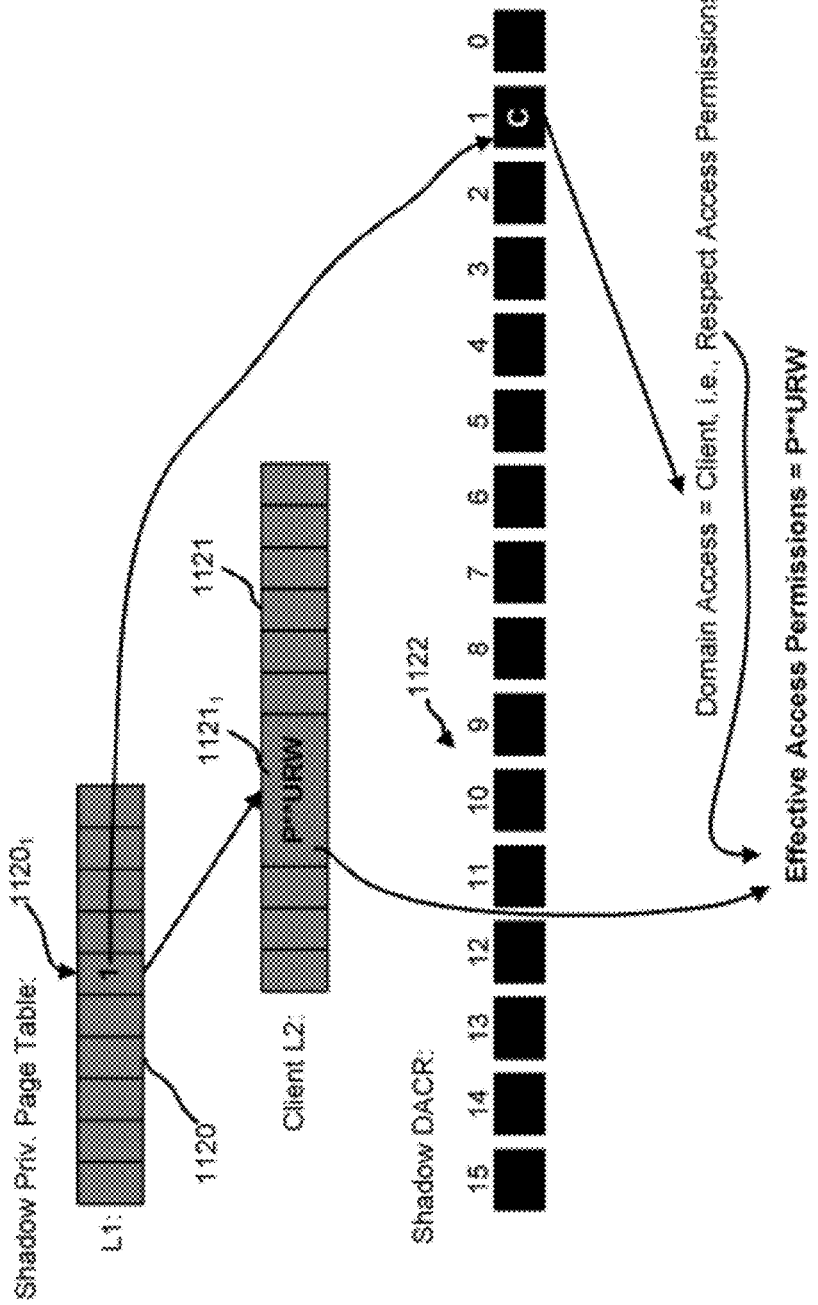
FIG. 6 illustrates how an "effective" guest access permission=PRW-URO is virtualized in accordance with one or more embodiments of the present invention utilizing a shadow privileged page table.

FIG. 6 illustrates how an "effective" guest access permission=PRW-URO is virtualized in accordance with one or more embodiments of the present invention utilizing a shadow privileged page table. As shown in FIG. 6, L1 descriptor 1120$_1$ in shadow privileged L1 page table 1120: (a) points to shadow privileged L2 page table 1121; and (b) has a domain identifier=1. As further shown in FIG. 6, using the privileged column in Table 1 above, guest access permission PRW-URO is mapped to P-URW in L2 descriptor 1121$_1$ of L2 page table 1121, and the entry in the shadow DACR, i.e., the machine DACR, for domain 1 has been set so that the domain access value=Client. Thus, combining the domain access value and the shadow access permission, after virtualization, the "effective" access permission=P-URW.

Figure 7:
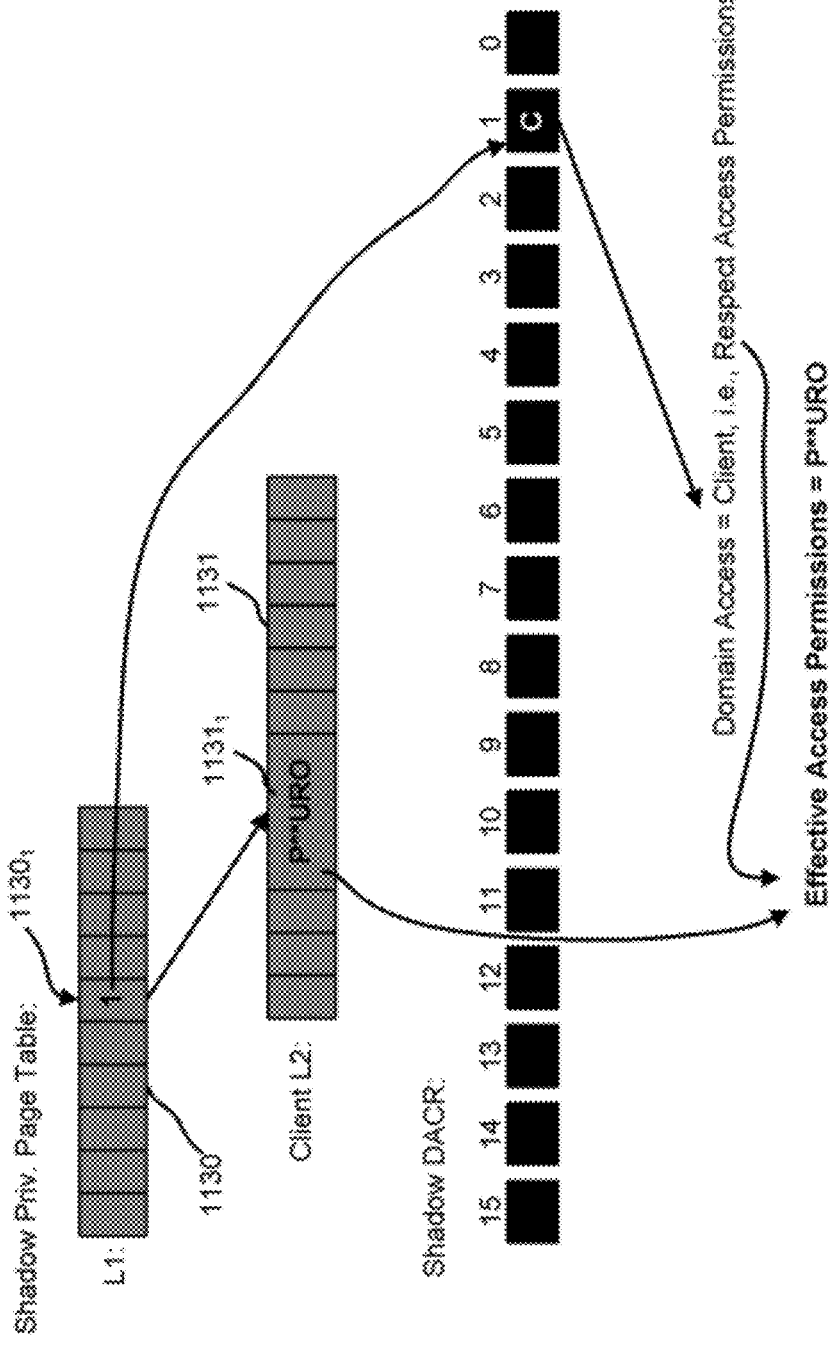
FIG. 7 illustrates how an "effective" guest access permission=PRW-URO is virtualized in accordance with one or more embodiments of the present invention utilizing a shadow user page table.

FIG. 7 illustrates how an "effective" guest access permission=PRW-URO is virtualized in accordance with one or more embodiments of the present invention utilizing a shadow user page table. As shown in FIG. 7, L1 descriptor 1130$_1$ in shadow user L1 page table 1130: (a) points to shadow user L2 page table 1131; and (b) has a domain identifier=1. As further shown in FIG. 7, using the user column in Table 1 above, guest access permission PRW-URO is mapped to P-URO in L2 descriptor 1131$_1$ of L2 page table 1131, and the entry in the shadow DACR, i.e., the machine DACR, for domain 1 has been set so that the domain access=Client. Thus, combining the domain access value and the shadow access permission, after virtualization, the "effective" access permission=P-URO.

Figure 8:
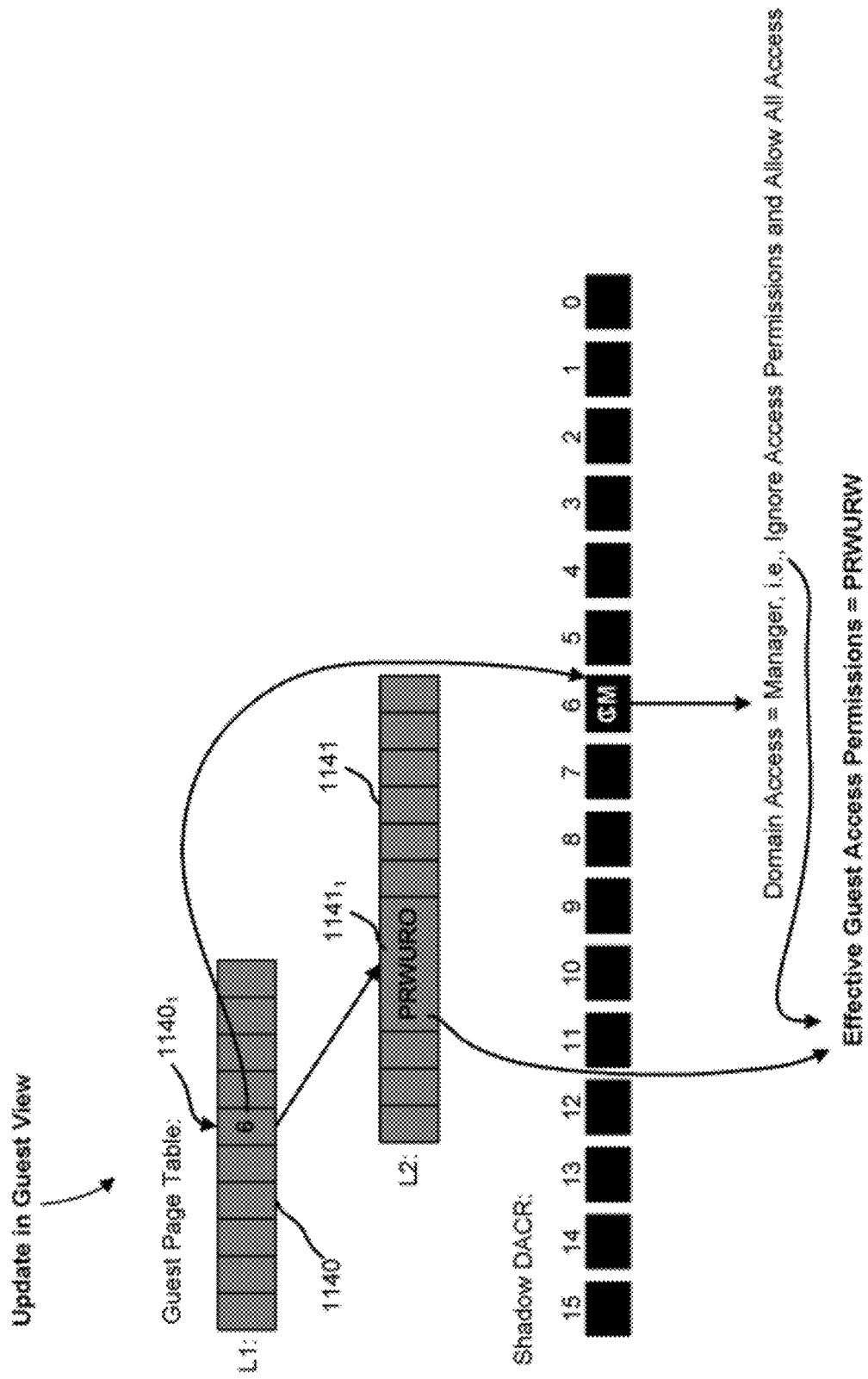
FIG. 8 shows how a guest update of its domain value in the guest DACR changes the "effective" guest access permission.

FIG. 8 shows how a guest update of its domain access value in the guest DACR changes the "effective" guest access permission. As shown in FIG. 8, L1 descriptor 1140$_1$ in L1 page table 1140: (a) points to L2 page table 1141; and (b) has a domain identifier=6. As further shown in FIG. 8, the guest access permission in L2 descriptor 1141$_1$ of L2 page table 1141=PRW-URO, and the guest DACR domain access value for domain 6 has changed from Client to Manager, i.e., domain access=Manager (meaning ignore Access Permissions and allow all accesses). Thus, combining the guest domain access value and the guest access permission, as seen from Table 1 above, the "effective" guest access permission=PRW-URW.

Figure 9:
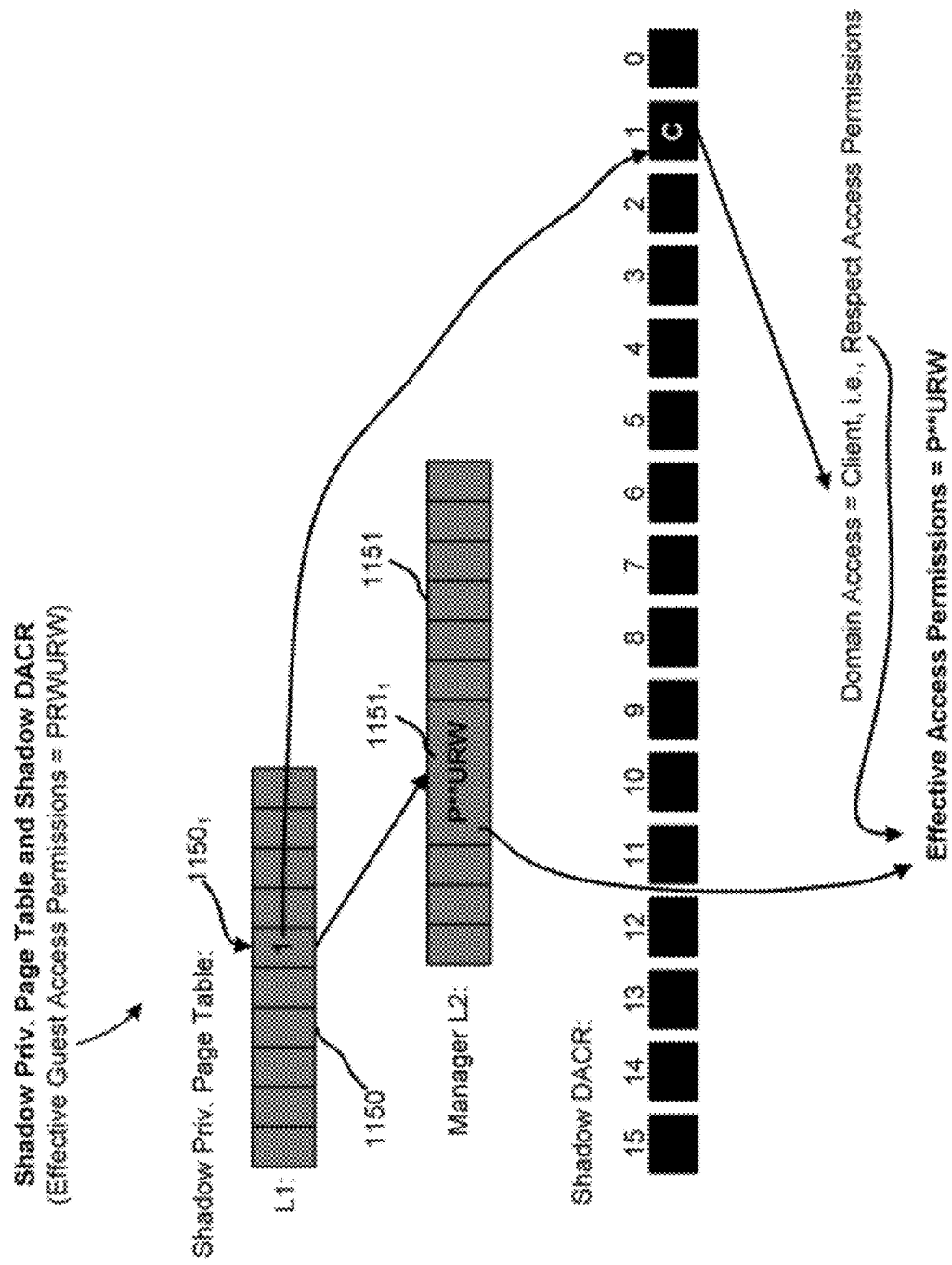
FIG. 9 illustrates how a guest update of the guest DACR (refer to FIG. 8 which shows the guest update to the DACR) to provide an "effective" guest access permission=PRW-URW is virtualized in accordance with one or more embodiments of the present invention utilizing a shadow privileged page table.

FIG. 9 illustrates how a guest update of the guest DACR (refer to FIG. 8 which illustrates the effect of a guest update to the guest DACR) to provide an "effective" guest access permission=PRW-URW is virtualized in accordance with one or more embodiments of the present invention utilizing a shadow privileged page table. As shown in FIG. 9, L1 descriptor 1150$_1$ in shadow privileged L1 page table 1150: (a) points to shadow L2 page table 1151; and (b) has a domain identifier=1. As further shown in FIG. 9, using the privileged column in Table 1 above, "effective" guest access permission PRW-URW has been mapped to P-URW in L2 descriptor 1151$_1$ of shadow L2 page table 1151, and the entry in the shadow DACR, i.e., the machine DACR, for domain 1 has been set so that the domain access value=Client. Thus, combining the domain access value and the shadow access permission, after virtualization, the "effective" access permission=P-URW.

Figure 10:
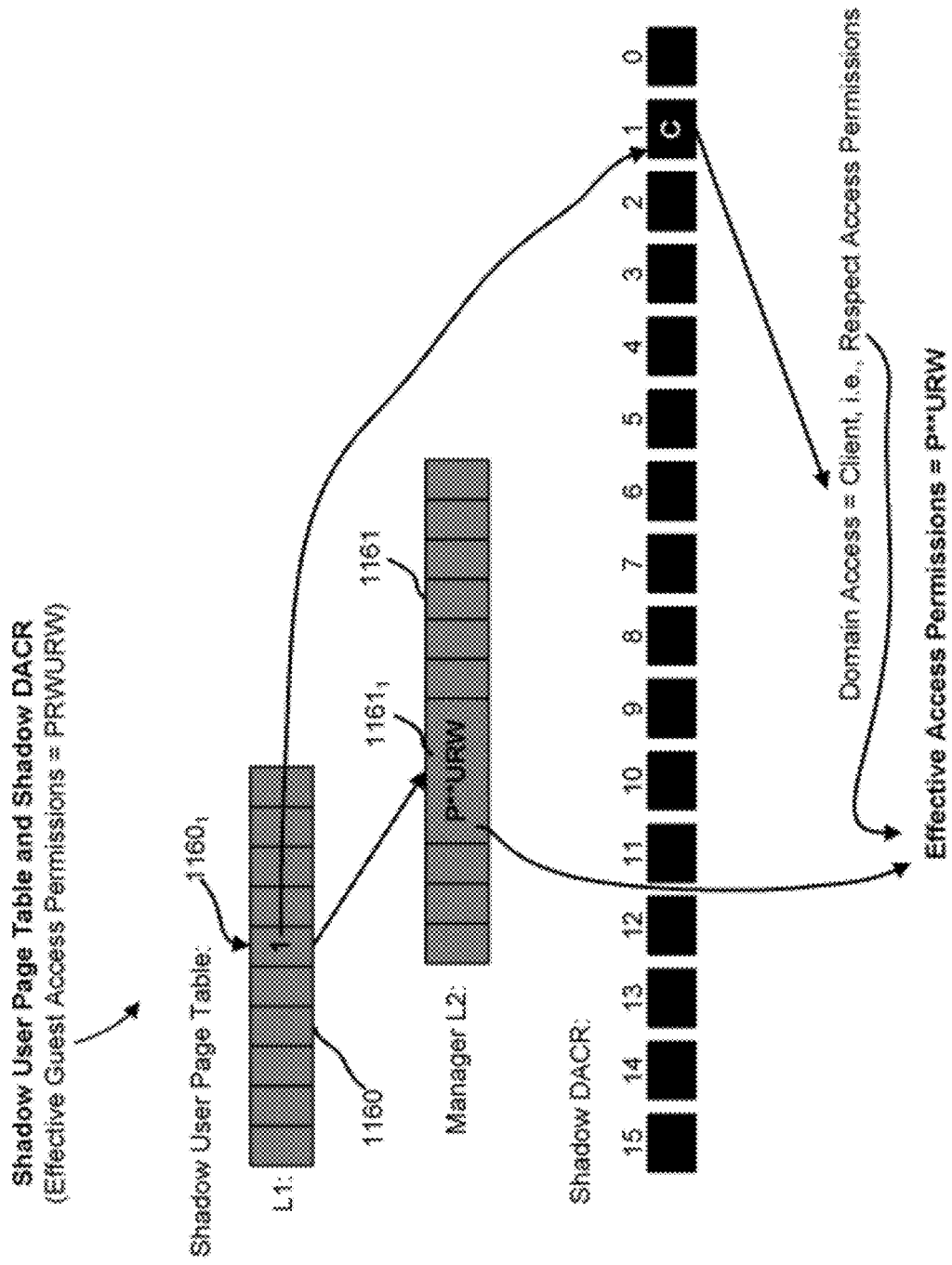
FIG. 10 illustrates how a guest update of the guest DACR (refer to FIG. 8 which shows the guest update to the DACR) to provide an "effective" guest access permission=PRW-URW is virtualized in accordance with one or more embodiments of the present invention utilizing a shadow user page table.

FIG. 10 illustrates how a guest update of the guest DACR (refer to FIG. 8 which shows the guest update to the guest DACR) to provide an "effective" guest access permission=PRW-URW is virtualized in accordance with one or more embodiments of the present invention utilizing a shadow user page table. As shown in FIG. 10, L1 descriptor $1160_1$ in shadow user L1 page table 1160: (a) points to shadow L2 page table 1161; and (b) has a domain identifier=1. As further shown in FIG. 10, using the user column in Table 1 above, "effective" guest access permission PRW-URW has been mapped to P-URW in L2 descriptor $1161_1$ of shadow L2 page table 1161, and the entry in the shadow DACR, i.e., the machine DACR, for domain 1 has been set so that domain access=Client. Thus, combining the domain access value and the shadow access permission, after virtualization, the "effective" access permission=P-URW.

As one of ordinary skill in the art can readily appreciate from the above, in accordance with one or more embodiments of the present invention, a guest update to the guest DACR (this is detected by trapping the guest's attempt to update the guest DACR which is a privileged-mode-only accessible register, as the guest is executing in user mode) requires that any affected shadow L1 page tables and/or shadow L2 page tables be adjusted since, for example, a shadow L2 page table backing a section with guest Manager access will have excessive access permissions if the corresponding domain has just been adjusted to Client.

In accordance with one or more embodiments of the present invention, each shadow L2 page table is identified by the following tuple:

tuple=Guest $L1$ descriptor value*{User, Privileged}*{Client,Manager} where: (a) the first component of the tuple (i.e., the guest L1 descriptor value) identifies guest section(s) the shadow L2 page table may back; (b) the second component of the tuple (i.e., {User, Privileged}) indicates whether the shadow L2 descriptor may be referenced by a shadow L1 descriptor used when the guest is executing in user mode or a shadow L1 descriptor used when the guest is executing in privileged mode; and (c) the third component of the tuple (i.e., {Client, Manager}) must match the domain access value implied by any referencing shadow L1 descriptor in the current shadow page table with the current guest DACR. The components of the tuple are referred to below as L2-guest-L1, L2-us-pr and L2-dom, respectively. In accordance with one or more embodiments of the present invention, shadow L2 page tables are tagged with the tuple using any one of a number of methods such as, for example and without limitation, the following methods: (a) the tuple is stored in page table metadata; or (b) data structures implement functions that map from the shadow L2 page table to the tuple components.

Additionally: (a) if the shadow L2 page table backs a region covered by a guest 16 MB superpage a 4-bit index is also stored that identifies the section within the 16 MB region described by the superpage the shadow L2 page table is to be used to back; and (b) information related to L2 page table sharing is also stored—in particular, this information is a backmap that identifies all parent L1 descriptors that point to the L2 page table, where there is more than one entry if the L2 page table is being shared. This information is needed so the shadow L1 descriptors can be invalidated when this L2 page table is invalidated and recycled.

For purposes of simplicity of illustration of various methods within the scope of the present invention, and without restricting the scope of the present invention, the descriptions below assume that the machine DACR has at least one domain reserved for the virtualization software. Further assume, merely for sake of simplicity that there is one domain reserved for virtualization software which is permanently set as Client and is denoted as the "Machine-Monitor-Domain."

Method 1: "L1 iterate and L2 drop/repopulate":

In accordance with one or more embodiments of the "L1 iterate and L2 drop/repopulate" method of the present invention, when a descriptor is brought into the shadow page table, the virtualization software uses the corresponding guest L1 descriptor's domain identifier and current guest DACR to determine the guest domain access value, which is then combined with the guest access permission specified in the descriptor to derive the effective guest access permission prior to performing the conversion specified in Table 1 (i.e., determining the effect guest access permission prior to using Table 1 to perform the steps described above in conjunction with FIGS. 6 and 7). If the guest domain access is Manager, the no-execute bit is overridden (i.e., set to 0). The virtualization software sets the shadow L1 descriptor domain identifier to identify the Machine-Monitor-Domain, and, if not already attached, the virtualization software attaches a shadow L2 page table with L2-dom set to the current domain access value for the section (in the No Access case, an L2 shadow page table is never attached, except in the special case handling mentioned above where the monitor and guest share a section). The shadow L1 descriptor should not be valid if the corresponding domain has a No Access value in the guest DACR (and, as a result, there are no L2 page tables for guest domain access=No Access).

In accordance with one or more embodiments of this method, when the guest modifies its DACR, for every shadow L1 page table, the virtualization software iterates over every L1 descriptor in the shadow L1 page table. If there is a valid shadow L1 descriptor, the corresponding guest L1 descriptor is obtained, and a lookup is performed in the new guest DACR. If there is a mismatch between the new guest domain access for the section (i.e., the value implied by the new DACR value) and the L2-dom page table marking of the shadow L2 page table pointed at by the shadow L1 descriptor, the entire shadow L2 page table is dropped and lazily repopulated on hidden shadow faults. In accordance with one or more alternative embodiments of this method, an alternative to dropping and lazily repopulating when the new guest DACR value is Client or Manager, is to iterate over some or all of the corresponding guest L2 page tables, and update the shadow L2 descriptor access permissions using the new guest DACR and Table 1 as described above, this is referred to as "proactively repopulating" below.

In accordance with one or more further alternative embodiments of this method, and as optimization 1, spare bits in the shadow L1 descriptor domain field (for example, two (2) bits) are used to store L2-dom. Hence three (3) machine domains {Machine-Monitor-Domain, Machine-Guest-Client-Domain, Machine-Guest-Manager-Domain} may be used to support the storing of L2-dom and distinguishing guest from virtualization software sections. In accordance with this further alternative, the domain access fields corresponding to the additional domains are set to Client in the machine DACR.

In accordance with one or more yet further alternative embodiments of this method, and as optimization 2 of this method, only the current shadow L1 page table is walked, and other shadow L1 page table iterations are deferred until there is a switch to a new shadow page table, i.e. on a user-privileged mode switch, LDRT/STRT emulation or CONTEXTIDR update. In accordance with this yet further alternative, during the switch, the updated guest DACR and the last observed (i.e., previous) guest DACR for the shadow L1 page table are compared, and the iteration is performed only if there is a difference. As a result, temporary DACR updates by the guest in a single context will not cause work to be performed on unrelated shadow page tables.

Method 2: "L1 Iterate and L2 Swizzle":

The "L1 iterate and L2 drop/repopulate" method described above may be expensive if there are frequent guest DACR updates—for example, in accordance with one or more embodiments where a shadow L1 page table occupies 16 KB of memory, iteration is over 4096 entries. Because many shadow L2 page tables may have to be dropped as a result of the steps described above on guest DACR updates, this leads to direct and indirect "costs." Direct "costs" are related to cache impact and TLB maintenance operations, and indirect "costs" result from additional hidden shadow faults required to repopulate the shadow tables backing the guest address space in the sections dropped. Alternatively, proactively repopulating shadow L2 page tables comes at the expense of having to recompute new access permissions and iterating over the corresponding guest L2 page table, also carrying both a time overhead and cache pollution cost.

In accordance with one or more embodiments of the "L1 iterate and L2 swizzle" method, an improvement can be achieved by maintaining two shadow L2 page tables for each section, for example, each 1 MB section, of guest address space covered by a shadow L1 descriptor (referred to herein as "L2 swizzle"). In accordance with one or more such embodiments of this method, one shadow L2 page table is used when the domain for the section has Client access in the guest DACR, and the other shadow L2 page table is used when the domain for the section has Manager access in the guest DACR. The Client L2 shadow page table is referred to as a complementary table of the Manager L2 shadow page table, and vice versa. As a result of using the "L1 iterate and L2 swizzle" method, there are up to four (4) shadow L2 page tables for each guest L1 page table descriptor due to the Cartesian product of the domain access values and mode values {User, Privileged}×{Client, Manager}.

Figure 11:
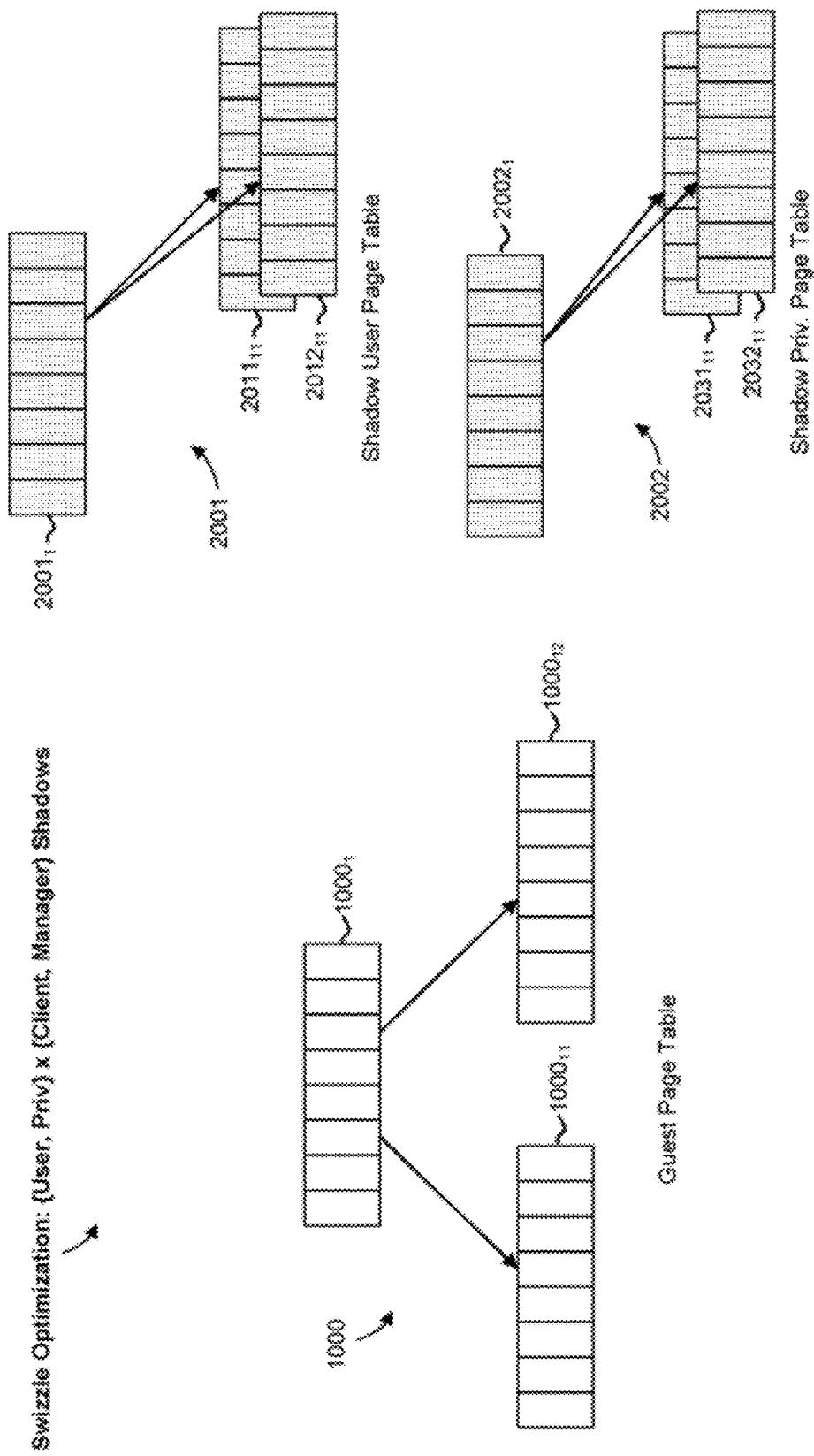
FIG. 11 shows in diagrammatic form how a guest page table is represented by a shadow user page table having one set of L2 page tables for use when the domain access value equals Client and another set of L2 page tables for use when the domain access value equals Manager and a shadow privileged page table having one set of L2 page tables for use when the domain access value equals Client and another set of L2 page tables for use when the domain access value equals Manager in accordance with one or more embodiments of the present invention.

FIG. 11 shows, in diagrammatic form, how guest page table 1000 (comprised of L1 page table 1000₁ that points to L2 page tables such as L2 page tables 1000₁₁ and 1000₁₂) is represented by shadow user page table 2001 (comprised of shadow user L1 page table 2001₁ that points to L2 page tables such as L2 page table 2011₁₁ that is used when the guest domain access value equals Client and L2 page table 2012₁₁ that is used when the guest domain access value equals Manager) and shadow privileged page table 2002 (comprised of shadow privileged L1 page table 2002₁ that points to L2 page tables such as L2 page table 2031₁₁ that is used when the guest domain access value equals Client and L2 page table 2032₁₁ that is used when the guest domain access value equals Manager).

In accordance with one or more such embodiments, when the guest modifies its DACR, for every shadow L1 page table, the virtualization software carries out an iteration over every L1 descriptor in the shadow L1 page table. If there is a valid shadow L1 descriptor, the corresponding guest L1 descriptor is obtained, and a lookup is performed in the new guest DACR. If there is a mismatch between the new (i.e., or updated) guest domain access for the section (i.e., the new DACR value) and the L2-dom page table marking of the shadow L2 page table pointed at by the shadow L1 descriptor, the shadow L1 descriptor is modified, depending on the new domain access value, as follows:

No access—invalidate the shadow L1 descriptor if it was previously valid

Client—set the shadow L1 descriptor to point to the Client shadow L2 page table for the section if it exists and is not already pointed to Manager—set the shadow L1 descriptor to point to the Manager shadow L2 page table for the section if it exists and is not already pointed to.

In all of the above cases, the former Client or Manager shadow L2 page table is not freed and may be reattached during the above steps in a later guest DACR update. In addition, optimizations 1 and 2 described above in conjunction with the "L1 iterate and L2 drop/repopulate" method may be used with embodiments of the "L1 iterate and L2 swizzle" method. Thus, the "L1 iterate and L2 swizzle" method mitigates the costs of dropping and repopulating the L2 shadow page tables.

In accordance with one or more alternative embodiments of this method, and as optimization, the Client and Manager shadow L2 page tables are lazily allocated. Thus, if a section is only used by the guest with Client domain access, there is no need to allocate the Manager shadow L2 page table for the section.

Method 3: "Domain Track and L2 Swizzle":

In accordance with one or more embodiments of the "Domain track and L2 swizzle" method, to avoid the need to iterate over entire guest and shadow L1 page tables, the virtualization software maintains the following: (a) a mapping $\phi$ from guest domain identifier (i.e., domain) to the set of shadow L2 page tables that back guest L1 sections marked with the domain identifier, i.e. L2-guest-L1 contains the domain identifier; and (b) with each such shadow L2 page table, a set $\omega$ of back-pointers to "potentially referencing" shadow L1 descriptors. In accordance with one or more such embodiments, potentially referencing shadow L1 descriptors include: (a) shadow L1 descriptors that in the current state reference the shadow L2 page table; (b) valid shadow L1 descriptors corresponding to guest L1 descriptors with value L2-guest-L1 and where the privilege level of the shadow L1 page table matches L2-us-pr.

In accordance with one or more such embodiments, when the guest modifies its DACR, the virtualization software computes an XOR of the new (i.e., updated) and old guest DACR. Then, only domains where the domain access differs between the new and old guest DACR are considered for the following. For each such domain d and each shadow L2 page table t in the set $\phi(d)$, there are two cases:

1. if the new guest domain access value is No Access, any potentially referencing shadow L1 descriptors are invalidated and have finished with t (i.e., do not continue to steps 2 and 3 below, but instead go or loop to the next t in $\phi(d)$)

2. if the domain access marking of t (i.e., L2-dom) matches the new guest domain access value, ensure that all potentially referencing shadow L1 descriptors are updated to point to t (if not already pointing to t)

3. if the domain access marking of t (i.e., L2-dom) does not match the new guest domain access value, there are two sub-cases:

(a) the complementary shadow L2 page table is in the set $\phi(d)$—if this is true, nothing needs to be done (go or loop to the next t in $\phi(d)$) since step 2 above will take care of adjusting the potentially referencing shadow L1 descriptors when considering t for the complementary table (b) the complementary shadow L2 page table is not in the set $\phi$ (d)—if this is true, the potentially referencing shadow L1 descriptors are invalidated. Optionally, the complementary shadow L2 page table may be allocated at this point and, optionally, the potentially referencing shadow L1 descriptors may be set to point at it.

Figure 12:
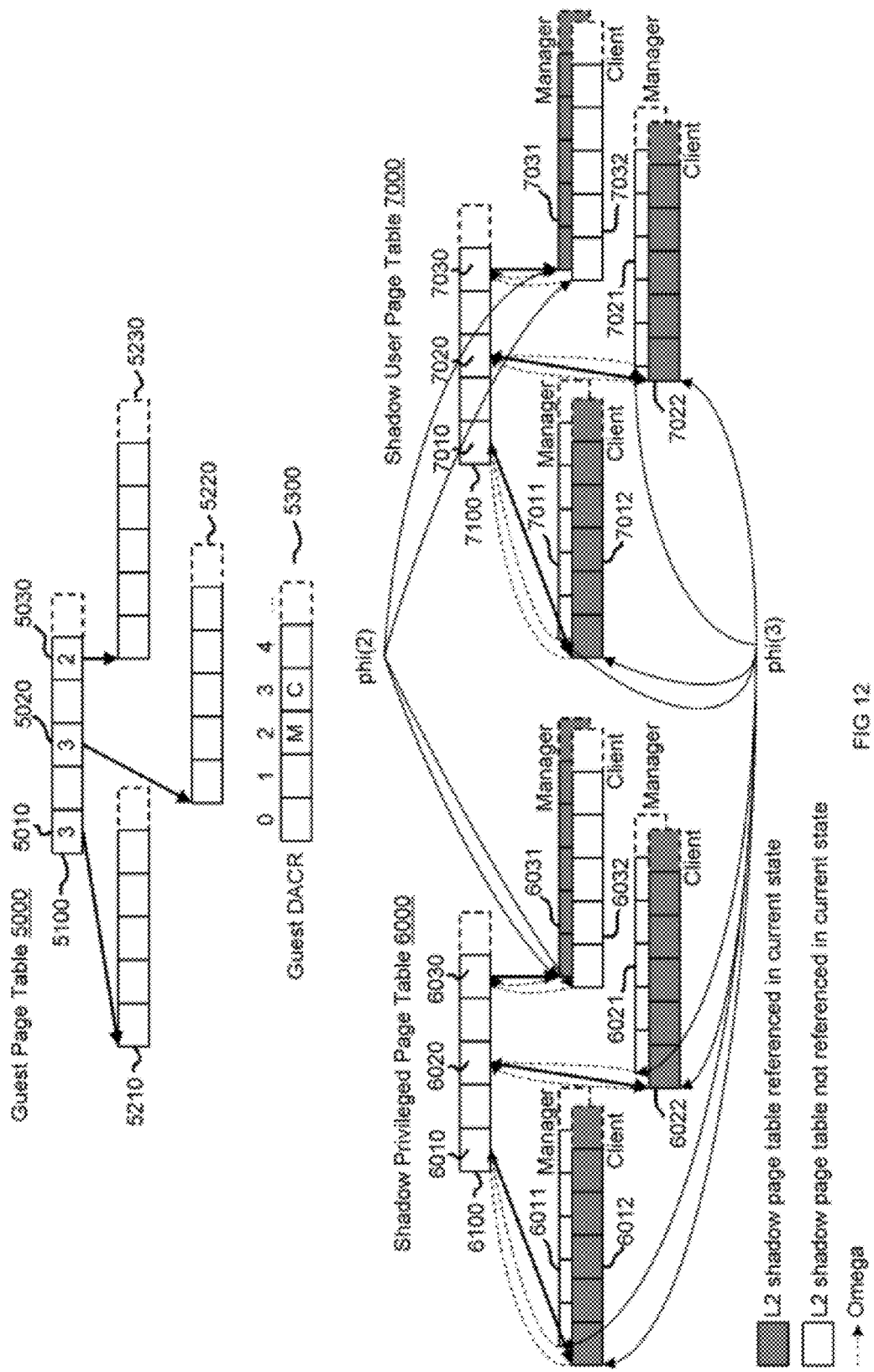
FIGS. 12 and 13 show, in diagrammatic form, a guest page table and guest DACR with corresponding shadow page tables configured before and after an update to the guest DACR, respectively, where the shadow page tables are provided in accordance with a an embodiment of a "Domain track and L2 swizzle" method of the present invention.
Figure 13:
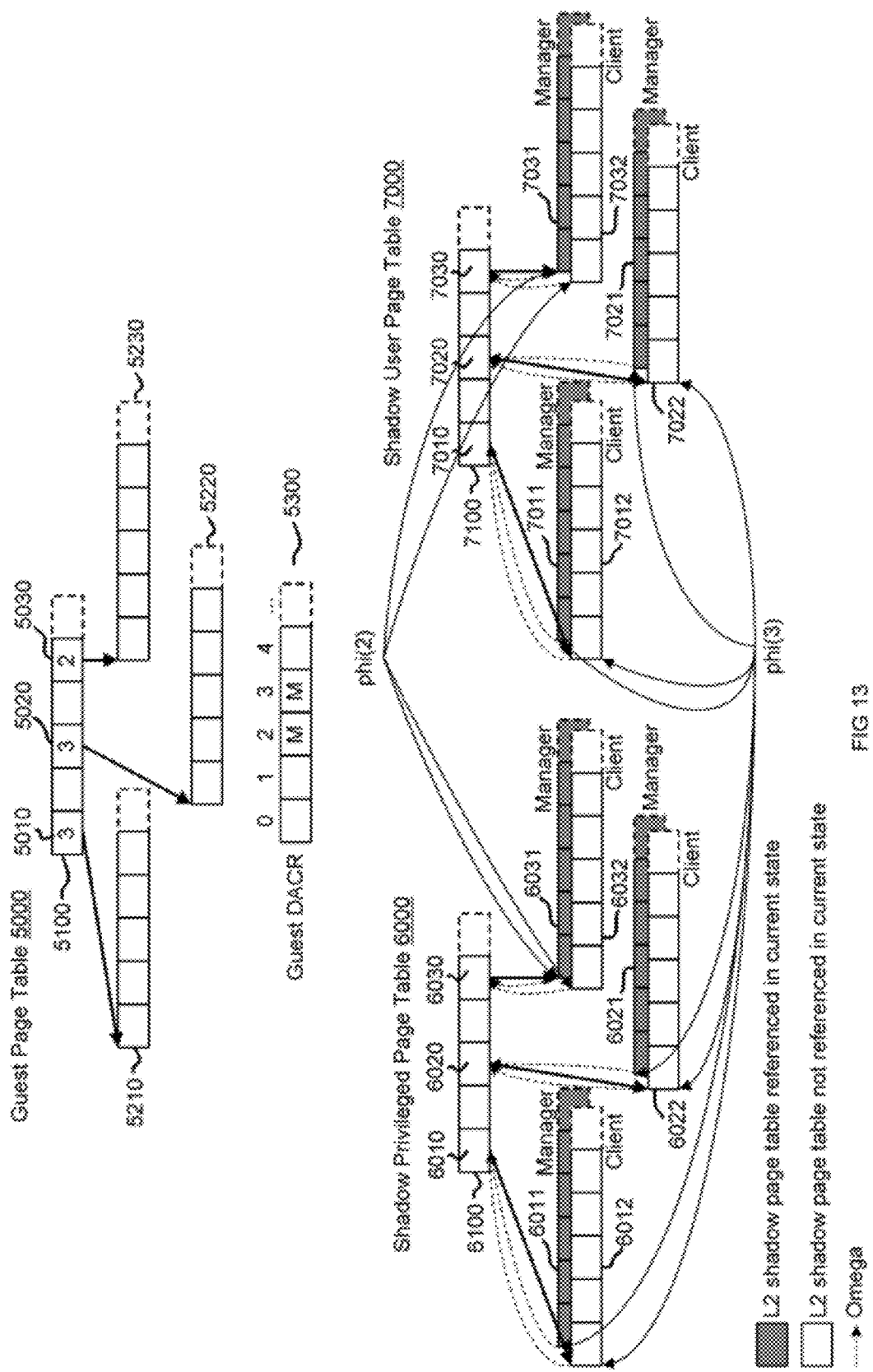

FIGS. 12 and 13 show, in diagrammatic form, guest page table 5000 and guest DACR 5300 with corresponding shadow privileged page table 6000 and shadow user page table 7000 configured before and after an update to guest DACR 5300, respectively, where shadow page tables 6000 and 7000 are provided in accordance with an embodiment of the "Domain track and L2 swizzle" method of the present invention. As shown in FIG. 12, guest L1 page table 5100 includes: (a) L1 descriptor 5010 (L1 descriptor 5010 has a domain identifier=3 and L1 descriptor 5010 points to L2 page table 5210); (b) L1 descriptor 5020 (L1 descriptor 5020 has a domain identifier=3 and L1 descriptor 5020 points to L2 page table 5220); and (c) L1 descriptor 5030 (L1 descriptor 5030 has a domain identifier=2 and L1 descriptor 5030 points to L2 page table 5230). As further shown in FIG. 12, guest DACR 5300 has a domain access value equal to Manager for domain=2 and a domain access value equal to Client for domain=3.

As further shown in FIG. 12, shadow privileged page table 6000 includes shadow privileged L1 page table 6100 and shadow user L1 page table 7100. As shown in FIG. 12, shadow privileged L1 page table 6100 includes: (a) shadow privileged L1 descriptor 6010 that points to L2 page table 6011 that is used when the guest domain access value equals Manager and to L2 page table 6012 that is used when the guest domain access value equals Client); (b) shadow privileged L1 descriptor 6020 that points to L2 page table 6021 that is used when the guest domain access value equals Manager and to L2 page table 6022 that is used when the guest domain access value equals Client); and (c) shadow privileged L1 descriptor 6030 that points to L2 page table 6031 that is used when the guest domain access value equals Manager and to L2 page table 6032 that is used when the guest domain access value equals Client).

As shown in FIG. 12, shadow user L1 page table 7100 includes: (a) shadow user L1 descriptor 7010 that points to L2 page table 7011 that is used when the guest domain access value equals Manager and to L2 page table 7012 that is used when the guest domain access value equals Client); (b) shadow user L1 descriptor 7020 that points to L2 page table 7021 that is used when the guest domain access value equals Manager and to L2 page table 7022 that is used when the guest domain access value equals Client); and (c) shadow user L1 descriptor 7030 that points to L2 page table 7031 that is used when the guest domain access value equals Manager and to L2 page table 7032 that is used when the guest domain access value equals Client).

As shown in FIG. 12, the shaded L2 shadow page tables refer to L2 shadow page tables that are referenced in the current guest state, and the unshaded L2 shadow page tables refer to L2 shadow page tables that are not referenced in the current state.

As further shown in FIG. 12, in accordance with the above: (a) $\phi(2)$ points to: (i) shadow privileged L2 page tables 6031 and 6032 and (ii) shadow user L2 page tables 7031 and 7032; and (b) $\phi(3)$ points to: (i) shadow privileged L2 page tables 6011, 6012, 6021 and 6022 and (ii) shadow user L2 page tables 7011, 7012, 7021 and 7022. As further shown in FIG. 12, in accordance with the above, each L2 page table has a set $\omega$: (a) for shadow privileged L2 page table 6011 this is {shadow privileged L1 descriptor 6010}; (b) for shadow privileged L2 page table 6012 this is {shadow privileged L1 descriptor 6010}; (c) for shadow privileged L2 page table 6021 this is {shadow privileged L1 descriptor 6020}; and so forth.

As shown in FIG. 13, there has been an update of guest DACR 5300 so that guest DACR 5300 has a domain equal to Manager for domain=3. As such, and in accordance with the above, the shaded shadow L2 page tables indicating those that are referenced by the current state illustrate the effect of the update of guest DACR 5300.

The set of potentially referencing shadow L1 descriptors for a shadow L2 page table and its complement should be identical. There are small permutations of the above steps required if one changes the back-pointer sets w, for example, as an optimization. For example, if one relaxes the definition (i.e., that the set of potentially referencing shadow L1 descriptors for a shadow L2 page table and its complement are identical) so that the union of the back-pointers for a shadow L2 page table and its complement be equal to the potentially referencing shadow L1 descriptors, then one has to always detach in step 3(a) above since the complement may not have back-pointers to all potentially referencing shadow L1 descriptors.

In accordance with one or more alternative embodiments of this method, and as optimization 1, the function domain of $\phi$ is changed to be the Cartesian product of guest domain identifier and L2-dom. If the complementary shadow L2 page table is required to always exist, then the size of the set of shadow L2 page tables to be considered is reduced. Call the old guest domain access value $v_{old}$ and the new guest domain access value $v_{new}$. Consider the cases for $v_{old} \rightarrow v_{new}$:

No access$\rightarrow v_{new}$—one only needs to consider $\phi(d, v_{new})$ $v_{old} \rightarrow$No access—one only needs to consider $\phi(d, v_{old})$ $V_{old} \rightarrow v_{new}$ where $v_{old}, v_{new} \neq$No Access—one only needs to consider either $\phi(d, v_{old})$ or $\phi(d, v_{new})$ (where $\phi(d, v_{new})$ is like $\phi(d)$, except that now it is the set of shadow L2 page tables with L2-guest-L1 containing d and L2-dom=$v_{new}$)

In accordance with one or more further alternative embodiments of this method, and as optimization 2, the guest or shadow ASID is added to the domain of $\phi$. Then the shadow L2 page tables are restricted to only those related to the current ASID. This allows for better scaling of the shadow pool size when used in conjunction with deferral of updates to non-current shadow L1 page tables.

Method 4: "Domain Track and L2 Drop/Repopulate":

In accordance with one or more embodiments of the "Domain track and L2 drop/repopulate" method, shadow L2 page tables associated with a domain: (a) are tracked as described above with respect to Method 3; and (b) are dropped/repopulated as described above with respect to Method 1 instead of maintaining complementary L2 page tables. This gains performance by avoiding iterating over L1 page tables. However, costs of shadow L2 page table dropping and repopulation still exist.

Method 5: "L1 Tagging":

In accordance with one or more embodiments of the "L1 tagging" method, shadow L1 page tables are tagged with guest DACR values, enabling switching between shadow L1 page tables during guest DACR updates. Since each shadow L1 page table has a unique ASID, DACR update cost would be reduced to TTBR and CONTEXTIDR updates. In accordance with this method, there is no need to drop, repopulate or swizzle L2 page tables since additional L1 page tables tagged with DACR are being maintained. However, an issue related to this method is that if a large number of distinct guest DACR values are in use by the guest, the number of shadow L1 page tables may grow rapidly. In addition, a penalty for the increased numbers of shadow L1 page tables is the increased memory and ASIDs used, as well as increased guest TLB maintenance virtualization and shadow recycling costs. However, this method ought to work well with Linux guests which have only two (2) distinct DACR values.

Method 6: "Observational Equivalence":

The following is a further optimization to above-identified Methods 1, 2, 3 and 4. If the guest is in user mode, and all valid guest page table descriptors covering a section (for example, guest L1 or L2 descriptors) indicate an access permission of P-URW and no descriptor has the no-execute bit set, then the same shadow L2 page table can be used, whether the guest DACR shows Client or Manager domain access for the section. Similarly, if the guest is in privileged mode, and all valid guest page table descriptors covering a section (for example, guest L1 or L2 descriptors) indicate an access permission of PRW-U and no descriptor has the no-execute bit set, then, again, the same shadow L2 page table can be used, whether the guest DACR shows Client or Manager domain access for the section. The use of a single shadow L2 page table saves space and (perhaps, more important) the number of hidden shadow page table faults.

For example, Method 6 can be used effectively when the guest modifies its DACR, and then reverts back to the original value while remaining in privileged mode. If no descriptors in the current shadow privileged page table have PRO-U or PNA-U access permissions (as is true on guests such as Linux) (hence all valid mappings are PRW-U**), Method 6 enables continued use of the existing shadow privileged page table with no changes during the temporary DACR modification. It is advantageous, when employing Method 6, to emulate guest LDRT/STRT instructions by walking the guest page table for instruction emulation rather than switching to the shadow user page table. This avoids having to modify the shadow user page table where the predicate for applying Method 6 may not hold. This provides an efficient method for virtualizing guests such as Linux in which temporary guest DACR modifications while in privileged mode are common, as it is possible to avoid the need to perform any shadow page table modification on guest DACR update.

Further Optimizations:

Further optimizations 1, 2, 3, 4 and 5 may be provided by using additional machine domains to support rapid transitions between guest {Client, Manager} and No access. In particular, for guest domains that are identified as being "frequently modified" (where a "frequently modified" guest domain means a guest domain whose frequency of modification exceeds a predetermined amount, such as, for example and without limitation, a system parameter) or for designated guest domains (both of which will be referred to as predetermined guest domains), one of the remaining machine domains is dedicated to each predetermined guest domain. Then, when transitioning back and forth between Client and No access, or Manager and No access, there is only a need to update the machine DACR for each dedicated machine domain, and not make any changes to the shadow page tables at all. This method may be used exclusively in the case where there are ≤15 guest domains in use and the DACR is static or updated as above. If this is not the case, machine domains are reserved only for the most frequently modified guest domains and one of the above-described methods can be employed in combination. Note however, that for transitions between Client and Manager, there still is a need to use one of the above methods, for example to drop, repopulate or swizzle the shadow L2 page tables.

Lastly, for guest domains in which there are no stolen entries and no sections shared with the virtualization software, the guest could have manager access in the machine DACR. In essence, a machine domain would be reserved for such a guest domain, and the domain access value provided by the guest would be passed through to the machine DACR in a DACR update for that domain. Other domains would continue to be treated with one of the other methods described above.

Although various exemplary embodiments of the subject disclosure have been disclosed, it will be apparent to those skilled in the art that various changes and modifications can be made which will achieve some of the advantages of the subject disclosure without departing from the spirit and scope of the subject disclosure. It will be clear to those reasonably skilled in the art that other components performing the same functions may be suitably substituted. Further, the methods of the subject disclosure may be achieved in either all software implementations, using the appropriate processor instructions, or in hybrid implementations which utilize a combination of hardware logic and software logic to achieve the same results.

Although the embodiments disclosed herein are described with reference to specific implementations, many other variations are possible. For example, the techniques and systems described herein may be used in both a hosted and a non-hosted virtualized computer system, regardless of the degree of virtualization, and in which the virtual machine(s) have any number of physical and/or logical virtualized processors. In addition, such functionality may also be implemented directly in a computer's primary operating system, both where the operating system is designed to support virtual machines and where it is not. Moreover, the concepts may even be implemented wholly or partially in hardware, for example in processor architectures intended to provide hardware support for virtual machines. Also, numerous programming techniques utilizing various data structures and memory configurations may be utilized to achieve the results described herein. For example, the tables, record structures and objects may all be implemented in different configurations, redundant, distributed, etc., while still achieving the same results.

Also, one or more embodiments of the present invention may also be implemented in other computer systems that involve less than full virtualization. Thus, one or more embodiments of the present invention may be implemented in systems in which direct access is provided to some physical resources, instead of virtualizing all physical resources. In addition, one or more embodiments of the present invention may be implemented in computer systems involving so-called paravirtualization. In paravirtualized computer systems, the virtualized hardware platform is not identical to an actual physical platform, so software that is designed to run on the actual physical platform should be modified or ported to run on the virtualized hardware platform. One or more embodiments of the present invention may be implemented in a wide variety of virtual computer systems, ranging from systems in which only selected physical resources are virtualized to systems in which a complete, actual hardware platform is virtualized.

In addition to any of the foregoing implementations, subject matter described herein may be implemented in either all software, all hardware, or a combination of hardware and software, including program code stored in firmware format to support dedicated hardware. A software implementation of the above described embodiment(s) may comprise a series of computer instructions either fixed on a tangible medium, such as a computer readable media, e.g. diskette, CD-ROM, or disks, or transmittable to a computer system in a carrier wave, via a modem or other interface device, such as a communications adapter connected to the network over a medium. Such transmittable computer instructions may be transmittable over communication media such as, but not limited to, optical or analog communications lines, or may be transmittable using wireless transmission techniques such as, but not limited to, microwave, infrared or other transmission techniques. The series of computer instructions, whether contained in a tangible medium or not, embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

What is claimed is:

1. In a computing system comprised of a processor and virtualization software including a guest operating system (OS) that utilizes a guest domain access control register (DACR) containing domain access information and guest page tables including first level page tables (L1 page tables) and second level page tables (L2 page tables), which guest page tables contain: (a) domain identifiers used to obtain domain access information from the guest DACR and (b) access permission information, wherein the domain access information and the access permission information are combined to provide an effective guest access permission, a method for providing shadow page tables and processor DACR settings that virtualize processor memory protection, which method comprises:
the virtualization software providing a shadow page table wherein:
(a) domain identifiers in the shadow page table are used to identify domain access information in the processor DACR that are mapped from the domain access information in the guest DACR; and
(b) access permissions in the shadow page table are mapped from the effective access permission information in the guest page tables based on a guest operation mode selected from a privileged mode and a user mode;
wherein a memory management unit (MMU) in the processor
traverses the shadow page table,
accesses the processor DACR, and
combines the mapped domain access information in the processor DACR with the mapped access permission in the shadow page table to reflect the guest intended effective access permissions while isolating the guest from the virtualization software.

2. The method of claim 1 wherein the shadow page table comprises:
a shadow privilege page table that is traversed by the MMU when the guest operates in privileged mode and a shadow user page table that is traversed by the MMU when the guest operates in user mode.

3. The method of claim 2 wherein the mapping of effective guest page table access permission to shadow page table access permission comprises:
if the effective guest access permission is PNA-UNA, the shadow privileged page table access permission is P-UNA and the shadow user page table access permission is P-UNA;
if the effective guest access permission is PRW-UNA, the shadow privileged page table access permission is P-URW and the shadow user page table access permission is P-UNA;
if the effective guest access permission is PRW-URO, the shadow privileged page table access permission is P-URW and the shadow user page table access permission is P-URO;
if the effective guest access permission is PRW-URW, the shadow privileged page table access permission is P-URW and the shadow user page table access permission is P-URW;
if the effective guest access permission is PRO-UNA, the shadow privileged page table access permission is P-URO and the shadow user page table access permission is P-URA; and
if the effective guest access permission is PRO-URO, the shadow privileged page table access permission is P-URO and the shadow user page table access permission is P-URO;
where: UNA means user no access, URO means user read-only, URW means user read-write, PNA means privileged no access, PRO means privileged read-only, and PRW means privileged read-write.

4. The method of claim 3 wherein:
a guest domain access value of No Access is mapped to No Access in the processor DACR and a guest domain access value of Client or Manager is mapped to Client access in the processor DACR.

5. The method of claim 1 wherein:
an effective access permission is determined by combining a domain identifier specified in the shadow page tables; a processor DACR mapping from domain identifier to domain access value; and access permissions specified in the shadow page tables.

6. The method of claim 2 wherein:
the shadow page table comprises shadow L1 page tables and shadow L2 page tables; and
each L2 page table is identified by the following tuple:

guest $L1$ descriptor value*{User,Privileged}*{Client, Manager} wherein: (a) the guest L1 descriptor value identifies a guest section the shadow L2 page table may back; (b) {User, Privileged} (referred to as L2-us-pr) indicates whether the shadow L2 descriptor may be referenced by a shadow L1 descriptor used when the guest is executing in user mode or a shadow L1 descriptor used when the guest is executing in privileged mode; and (c) {Client, Manager} (referred to as L2-dom) matches the domain access value implied by any referencing shadow L1 descriptor in the current shadow page table with the current guest DACR.

7. The method of claim 6 further comprising:
detecting a guest update to the guest DACR; and
the virtualization software adjusting affected shadow L1 page tables and shadow L2 page tables in the shadow page tables.

8. The method of claim 7 wherein adjusting comprises:
for every shadow L1 page table, the virtualization software iterating over every L1 descriptor in the shadow L1 page table as follows:
for a valid shadow L1 descriptor, obtaining a corresponding guest L1 descriptor and retrieving the updated guest domain access value;

determining whether the updated guest domain access value equals the L2-dom page table marking of the shadow L2 page table pointed at by the valid shadow L1 descriptor;

if not, dropping the shadow L2 page table.

9. The method of claim 8 which further comprises:

lazily repopulating the shadow L2 page table on hidden shadow faults.

10. The method of claim 7 wherein adjusting comprises:

for every shadow L1 page table, the virtualization software iterating over every L1 descriptor in the shadow L1 page table as follows:

for a valid shadow L1 descriptor, obtaining a corresponding guest L1 descriptor and retrieving the updated guest domain access value and iterating over some or all of the corresponding guest L2 page tables which comprises:

obtaining the effective access permission, and mapping access permissions in shadow L2 descriptors of corresponding shadow L2 page tables using the updated guest DACR and the effective access permission.

11. The method of claim 8 wherein:

assigning two domains for use by the guest;

setting domain access fields in the processor DACR for the domains that are used by the guest to Client; and storing L2-dom in a shadow L1 descriptor.

12. The method of claim 10 wherein:

assigning two domains for use by the guest;

setting domain access fields in the processor DACR for the domains that are used by the guest to Client; and storing L2-dom in a shadow L1 descriptor.

13. The method of claim 7 wherein adjusting comprises:

for a current shadow L1 page table, the virtualization software iterating over every L1 descriptor in the shadow L1 page table as follows:

for a valid shadow L1 descriptor, obtaining a corresponding guest L1 descriptor and retrieving the updated guest domain access value;

determining whether the updated guest domain access value equals the L2-dom page table marking of the shadow L2 page table pointed at by the valid shadow L1 descriptor;

if not, dropping the shadow L2 page table.

14. The method of claim 13 wherein the step of iterating for the current shadow L1 page table is carried out over a new shadow L1 page table when there is a switch from the current shadow L1 page table.

15. The method of claim 14 wherein iterating further comprises:

when there is a switch, for the new shadow L1 page table, comparing the updated guest DACR value with the previous guest DACR value for the shadow L1 page table, and only iterating if there is a difference.

16. The method of claim 7 wherein adjusting comprises:

for a current shadow L1 page table, the virtualization software iterating over every L1 descriptor in the shadow L1 page table as follows:

for a valid shadow L1 descriptor, obtaining a corresponding guest L1 descriptor and retrieving the updated guest domain access value and iterating over some or all of the corresponding guest L2 page tables which comprises:

obtaining the effective access permission, and mapping access permissions in shadow L2 descriptors of corresponding shadow L2 page tables using the updated guest DACR and the effective access permission.

17. The method of claim 16 wherein the step of iterating for the current shadow L1 page table is carried out over the new shadow L1 page table when there is a switch from the current shadow L1 page table.

18. The method of claim 17 wherein iterating further comprises:

when there is a switch, for the new shadow L1 page table, comparing the updated guest DACR value with the previous guest DACR value for the shadow L1 page table, and only iterating if there is a difference.

19. The method of claim 6 further comprising tagging shadow L1 page tables with guest DACR values.

20. The method of claim 7 wherein a machine domain is reserved for guest domains having no stolen entries and no sections shared with the virtualization software, the method further comprising:

the virtualization software passing a domain access value provided by the guest to the processor DACR in a DACR update for guest domains having no stolen entries and no sections shared with the virtualization software.

21. The method of claim 6 wherein a processor domain is dedicated to a predetermined guest domain, the method further comprising:

detecting a guest update to the guest DACR;

if the predetermined guest domain changes from Client to No Access or vice versa or if the predetermined guest domain changes from Manager to No Access or vice versa, the virtualization software updating the machine DACR for the dedicated processor domain; otherwise;

the virtualization software adjusting affected shadow L1 page tables and shadow L2 page tables in the shadow page tables.

22. The method of claim 7 wherein adjusting further comprises:

the virtualization software determining:

whether: (a) the guest is in user mode, (b) all valid guest page table descriptors for a section indicate an effective access permission of P-URW, and (c) no descriptor has a no-execute bit set; and, if so, using one shadow L2 page table whether the domain access value in the guest DACR equals Client or Manager domain access; and whether: (a) the guest is in privileged mode, (b) all valid guest page table descriptors for a section indicate an effective access permission of PRW-U, and (c) no descriptor has the no-execute bit set; and, if so, using one shadow L2 page table whether the domain access value in the guest DACR equals Client or Manager domain access.

* * * * *